United States Patent
Sachs et al.

(10) Patent No.: US 6,508,980 B1
(45) Date of Patent: Jan. 21, 2003

(54) METAL AND CERAMIC CONTAINING PARTS PRODUCED FROM POWDER USING BINDERS DERIVED FROM SALT

(75) Inventors: Emanuel M. Sachs, Newton, MA (US); Constantinos Hadjiloucas, Cyprus (BE); Samuel Allen, Jamaica Plain, MA (US); Helen J. Yoo, Maplewood, MN (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/509,284

(22) PCT Filed: Sep. 25, 1998

(86) PCT No.: PCT/US98/20129

§ 371 (c)(1),
(2), (4) Date: Jul. 7, 2000

(87) PCT Pub. No.: WO99/15293

PCT Pub. Date: Apr. 1, 1999

Related U.S. Application Data

(60) Provisional application No. 60/060,090, filed on Sep. 26, 1997.

(51) Int. Cl.[7] ............................... B22F 3/26; B22F 1/00
(52) U.S. Cl. ............................ 419/45; 419/26; 419/36; 419/37
(58) Field of Search .......................... 419/36, 37, 45, 419/27

(56) References Cited

U.S. PATENT DOCUMENTS

| | | | |
|---|---|---|---|
| 3,350,200 A | 10/1967 | Sandstede et al. | 75/208 |
| 3,382,067 A | 5/1968 | Sandstede et al. | 75/208 |
| 4,011,073 A | 3/1977 | Powers et al. | 75/0.5 |
| 4,236,924 A | 12/1980 | Robins et al. | 75/211 |
| 4,327,156 A | 4/1982 | Dillon et al. | 428/568 |
| 4,431,449 A | 2/1984 | Dillion et al. | 75/246 |
| 4,455,354 A | 6/1984 | Dillion et al. | 428/568 |
| 4,554,218 A | 11/1985 | Gardener et al. | 428/567 |
| 4,777,015 A | 10/1988 | Kemp, Jr. et al. | 419/32 |
| 5,204,055 A | 4/1993 | Sachs et al. | 419/2 |
| 5,340,656 A | 8/1994 | Sachs et al. | 428/546 |
| 5,387,380 A | 2/1995 | Cima et al. | 264/69 |
| 5,510,066 A | 4/1996 | Fink et al. | 264/40.1 |
| 5,512,162 A | 4/1996 | Sachs et al. | 205/91 |
| 5,518,680 A | 5/1996 | Cima et al. | 264/401 |
| 5,697,043 A | 12/1997 | Baskaran et al. | 419/30 |

OTHER PUBLICATIONS

Lee, J, Takahashi, M. and Sano T., "A New Aqueous Injection Method of Fabricating W–Cu Parts," P. 577–591, *Materials and Manufacturing Processes*, vol. 12, No. 4, 1997.

Federov, N.F., Sokolova, R.A. and Kochetov, N.N., "Binding Substances from Metal Powders,".

(cont.) trans. from Poroshkovaya Metallurgiyia, No. 2 (134), pp. 102–104, Feb. 1974.

Pinkerton, H.L., "Nonelectrolytic Metal Coating Processes," volume uncertain, date uncertain but definitely before Sep. 26, 1996.

Primary Examiner—Daniel J. Jenkins
(74) Attorney, Agent, or Firm—Steven J. Weissburg

(57) ABSTRACT

Parts made from powder use a material that originates from a salt to bind powder particles together. The salt may be provided dissolved in a solution, as molten salt, or as a dry powder. The figure is an electron micrograph of a cross section of a silver nitrate bound product with a skeleton of steel powder.

53 Claims, 28 Drawing Sheets

METAL AND CERAMIC CONTAINING PARTS PRODUCED FROM POWDER USING BINDERS DERIVED FROM SALT

RELATED APPLICATIONS

Priority is claimed to U.S. Provisional application 60/060,090, filed on Sep. 26, 1997, in the names of four of the present inventors, entitled REACTIVE BINDERS FOR METAL PARTS PRODUCED BY THREE DIMENSIONAL PRINTING, the entire disclosure of which is herein incorporated fully by reference.

GOVERNMENT RIGHTS

The United States Government has certain rights in this invention pursuant to Contract/Grant NATIONAL SCIENCE FOUNDATION COOPERATIVE AGREEMENT DMI-9420964.

BACKGROUND

This invention relates to metal and ceramic containing parts that are formed from powder, and more particularly to a method of making and control of the dimensions of such parts.

Standard practice in powder metallurgy falls into two basic categories. In powder pressing, powder is placed between two hardened steel dies and compacted, typically to densities of 80% or more. This compaction involves the deforming the powder particles so that they mechanically interlock, thus creating a porous skeleton. Often this skeleton is subsequently infiltrated with a lower melting point material in order to form a fully dense part. For example, skeletons of steel powder are often infiltrated with copper alloys.

Alternatively, the techniques of metal injection molding are used, where a powder is mixed with a binder material and is injected into a die. After the binder has solidified, the powder component is removed. This green part is typically approximately 60% dense. The binder is then burned off or removed chemically and the skeleton is then sintered. Generally speaking, the skeleton is sintered to near full density.

In the fabrication of metal components by powder metallurgy, the control of the dimensions of the final component is often an important issue. Such dimensional control becomes an especially important issue when the components being made are to be used as tools and dies for the fabrication of other components by forming processes.

In a known tooling process, described in general in U.S. Pat. No. 4,554,218 entitled INFILTRATED POWDERED METAL COMPOSITE ARTICLE, issued on Nov. 19, 1985, in the name of Gardner, et al., a skeleton is formed by packing powder around a form and holding it together with a polymeric binder. After removal from the form, the polymeric binder is burned off and the skeleton is lightly sintered. A subsequent infiltration with a low melting point alloy provides a fully dense part.

The two most common approaches for densifying a powder skeleton are either to sinter it to full density or to fill the voids in the skeleton with a second material. These voids may be filled by infiltration of a lower melting point metal, or by infiltration of a polymeric material such as an epoxy.

The skeleton that is formed in the first step of the process may range in density from 55–85%. If sintering to full density is chosen, a significant amount of additional shrinkage must be incurred. The shrinkage arises because material migrates from within the bodies of particles to form larger necks between particles. For example, if a skeleton of 60% density is sintered to full density, the shrinkage must be approximately 18% linear. This large amount of shrinkage can cause significant problems if the goal is to maintain good dimensional accuracy. For example, if a 1% variation in shrinkage is encountered then a dimension which requires a 15% shrink will have an uncertainty of 0.15% of original. Thus, a 10 cm dimension will be uncertain by 0.15 mm, a very significant error when precision components are considered. For this reason, the method of creating a skeleton and then sintering the skeleton to full density in a secondary operation is not attractive when precision parts are concerned.

A processing technique that uses powders has become known as "three-dimensional printing" ("3D Printing") and is described in general in numerous patents, including: U.S. Pat. No. 5,204,055, entitled THREE-DIMENSIONAL PRINTING TECHNIQUES, by Sachs, Haggerty, Cima, and Williams; U.S. Pat. No. 5,340,656, entitled THREE-DIMENSIONAL PRINTING TECHNIQUES, by Sachs, Haggerty, Cima, and Williams; U.S. Pat. No. 5,387,380, entitled THREE-DIMENSIONAL PRINTING TECHNIQUES, by Cima, Sachs, Fan, Bredt, Michaels, Khanuja, Lauder, Lee, Brancazio, Curodeau, and Tuerck; U.S. Pat. No. 5,490,882, entitled PROCESS FOR REMOVING LOOSE POWDER PARTICLES FROM INTERIOR PASSAGES OF A BODY, by Sachs, Cima, Bredt, and Khanuja; and U.S. Pat. No. 5,660,621, entitled BINDER COMPOSITION FOR USE IN THREE-DIMENSIONAL PRINTING, by James Bredt; U.S. Pat. No. 5,771,402, issued Jul. 7, 1998, entitled ENHANCEMENT OF THERMAL PROPERTIES OF TOOLING MADE BY SOLID FREE FORM FABRICATION TECHNIQUES, by Allen, Michaels, and Sachs; and U.S. Pat. No. 5,807,437, issued on Sep. 15, 1998, entitled HIGH SPEED, HIGH QUALITY THREE DIMENSIONAL PRINTING, by Sachs, Curodeau, Fan, Bredt, Cima, and Brancazio. All of the foregoing 3D Printing patents are incorporated herein fully by reference.

3D Printing is also disclosed and discussed in co-pending, co-assigned applications, including: U.S. Ser. No. 08/600,215, filed Feb. 12, 1996, entitled CERAMIC MOLD FINISHING TECHNIQUES FOR REMOVING POWDER, by Sachs, Cima, Bredt, Khanuja, and Yu; U.S. Ser. No. 08/856,515, filed May 15, 1997, entitled CONTINUOUS INK-JET DROPLET GENERATOR, by Sachs and Serdy; U.S. Ser. No. 08/831,636, filed Apr. 9, 1997, entitled THREE DIMENSIONAL PRODUCT MANUFACTURE USING MASKS, by Sachs and Cima; U.S. Ser. No. 60/060,090, filed Sep. 26, 1997, entitled REACTIVE BINDERS FOR METAL PARTS PRODUCED BY THREE DIMENSIONAL PRINTING, by Sachs, Yoo, Allen, and Cima (provisional application); U.S. Ser. No. 60/094,288, filed Jul. 27, 1998, entitled METHOD OF MAKING INJECTION MOLDS HAVING COOLING CHANNELS THAT ARE CONFORMAL TO THE BODY CAVITY, by Xu and Sachs (provisional application); and PCT application PCT/US98/12280, filed Jun. 12, 1998, which designates the U.S., entitled JETTING LAYERS OF POWDER AND THE FORMATION OF FINE POWDER BEDS THEREBY, by Sachs, Caradonna, Serdy, Grau, Cima, and Saxton. All of the foregoing 3D Printing patent applications (and provisional application) are incorporated herein fully by reference.

The flexibility of the 3D Printing process makes it possible to construct a part out of any material available in powdered form. Such a part can possess almost any geometry, including overhangs, undercuts, and internal volumes. The 3D Printing process was initially developed for the production of ceramic shells and is also useful in making metal parts. One key use for such a system is the production of injection molding tooling for plastic parts. Injection molds are used to make a vast array of items, ranging from toys to floppy disks. The lead times for the production of such tools generally range from a few weeks to several months. The rapid production available via the 3D Printing process can greatly reduce this lead time, thereby alleviating a bottleneck and reducing the duration of product development.

Designers of plastic parts often call for fairly tight part tolerances. Therefore, the tolerances of the injection molds are also critical. In a known 3D Printing process, metal parts are produced by printing a polymer binder into stainless steel powder. The bound parts are subsequently furnace-treated to lightly sinter and debind. This debinding step requires burning out the polymer binder, which is typically a messy process that raises maintenance challenges. Once lightly sintered and debound, the parts are then infiltrated with a molten metal alloy. Sometimes, in order to prevent gravitational slumping and other forms of part distortion, the green part is loosely repacked in refractory material to support unsupported sections. This repacking is called "settering". In some cases, the infiltration step is accompanied by a second, more severe sintering step.

Such a more severe sintering step is provided to achieve certain mechanical properties, such as higher impact toughness, yield and tensile strengths. It is believed that these properties improve due to increased necking between particles. However, it is just this necking during sintering that causes shrinkage.

These post-printing processes cause a total linear dimensional change of approximately −1.5%±0.2%. In other words, the average shrinkage is 1.5%. However, there is an uncertainty in the value of shrinkage of ±0.2%. For large parts, these uncertainties become extremely significant (in the absolute). This uncertainty results in the loss of some dimensional control of the parts. Furthermore, growth of the part is often observed during infiltration. While this growth can be predicted to a certain extent, this growth also carries an uncertainty, which then adds to the uncertainty of dimensions of the final infiltrated part.

The known 3D Printing process can compensate for a given amount of predicted shrinkage by beginning with a larger green part. The shrinkage that occurs during post-processing is accounted for when the green part is printed. However, as mentioned, the shrinkage has a certain amount (±0.2%) of error associated with it and furthermore is not uniform. This can lead to warped parts whose final dimensions bear some uncertainty. For this reason, alternate powder/binder systems for metal parts are desired.

Thus, there is a need to improve the dimensional control of metal parts produced by 3D Printing. One approach would be to use materials systems that have a lower average shrinkage. It is further presumed that the uncertainty (error) in shrinkage would be reduced commensurately. For example, a system with an average shrinkage of 0.1% will certainly have a variation (error) in shrinkage of less than ±0.1%. Further, a similar ratio of uncertainty in shrinkage to average shrinkage as is found today may be found, resulting in a variation in shrinkage of less than 0.02%. For example, if a tool with a dimension of 10 inches (25.4 cm) is fabricated by known 3D Printing techniques, the tolerance that can be held is +/−0.02 inches (0.05 cm). However, with a low shrink material system that has an uncertainty of +/−0.02%, the tolerance could be as low as +/−0.002 inches (0.005 cm).

It is not known in the art how to achieve a lower average shrinkage. A major contributor to the shrinkage is the sintering step, which draws major bodies of the powder granules together toward each other. Thus, a goal of the present invention is to minimize or eliminate sintering of the powder granules, and to the extent that any sintering arises, to minimize any shrinkage associated therewith. Because sintering would be reduced or eliminated according to such a possible approach, if densification is desired, it would be necessary to bring the part to full density by some other means, such as infiltration.

The chosen method of reducing shrinkage and distortion must also provide sufficient part strength and edge definition, and still permit successful infiltration of an infiltrant, if densification is desired. Furthermore, the chosen method must not adversely affect the mechanical properties of the finished part, such as yield and tensile strengths, impact toughness, etc. In fact, it would be preferred that the method of forming the skeleton positively aid in attaining desirable mechanical properties.

An additional aspect of known sintering techniques that is undesirable in some circumstances is the need to setter, i.e. to support a green part in refractory material to eliminate slumping and other deformation during sintering. This settering step is required because the material of the initial powder bed is essentially identical to that which will form the final part. Thus, if the entire bed were to be heated to a temperature that would sinter the locations of the powder that will make up the part, the entire bed would sinter into a monolithic block. The present solution to this problem, settering, has undesirable aspects. Settering requires an extra step of removing the unprinted regions of the original powder bed; packing the fragile green part in another powder bed, and insuring that all of the fragile regions of the part are supported; and again removing powder from the part after the sintering step. Further, there is an inherent conflict in sintering a part that is settered. The sintering part tends to shrink. However, the supporting settering powder tends to resist any such shrinkage. Moreover, settering is only an adjunct to a sintering step, which has its own drawbacks, as already mentioned.

There are also known techniques of mixing a binder solution with powder particles, to achieve a homogeneous mixture that is then molded, allowed to dry in a bound state, and then heat treated. The particles and the liquid must be thoroughly mixed, with much relative motion between the particles during mixing, to avoid clumping and achieve a homogeneous mixture. A drawback of mixing the binder to achieve a homogeneous mixture is that large amounts of liquid must be used to achieve a slurry that is sufficiently flowable to assume the desired shape. Consequently, the packing fraction of the powder is lower, and thus the green part is less dense. The relatively low packing fraction of the powder gives rise to material inhomogeneities, as the slurry flows to fill the mold. A further drawback of this method of providing the binder liquid is that it is not possible, or at best, very difficult, to provide the binder liquid in preselected regions within the body. In general, the entire body will be bound.

Thus, an objective of the present invention is to provide a method for fabricating a skeleton with little or no average shrinkage required for its formation and with a higher degree of certainty as to the variation in the shrinkage. It is a further objective of the invention to provide a skeleton that is highly resistant to distortion during subsequent densification steps.

Another objective of the invention is to provide a liquid binder at specific locations in a powder body, allowing the particles to come to rest substantially in the same positions that they will occupy in the final body, without requiring significant relative motion of the powder particles, and also obtaining a homogeneous combination of powder and liquid, with a high packing fraction.

It is a further objective of the invention to provide a preform that is ready for infiltration, without requiring that the preform be first treated in a first powder bed, and then removed and repacked in a second powder bed, from which it is also subsequently removed.

Still another object of the invention is to be able to retain fine features, as printed, by safely supporting these printed features through all processing steps.

Yet another object of the invention is to avoid sintering the main constitutive powder granules throughout the body of the part, with its inherent conflict between the shrinkage of the sintering part and the resistance to shrinkage of any support medium.

It is another object of the invention to provide necking in a body of particles, with corresponding improvement in desirable mechanical properties, but without the shrinkage that arises in connection with necking that occurs during sintering.

SUMMARY

It has been determined that if a process is used where the powder granules do not themselves sinter, shrinkage and the variation, or error in shrinkage, can be greatly reduced. Further, if a step that is different from sintering is used to give strength to the forming shape at a temperature that is below the sintering temperature of the main powder body, the part can be shaped and strengthened at this lower temperature in the original powder bed, without the need for settering. Thus, the delicate portions of the part are adequately supported.

The current invention creates the powder geometry in two distinct steps. In a first step, a powder is placed so that the particles are in maximum contact with each other. Further, the body of powder is shaped as desired, for instance in a layer, or in or around a mold. In a second step, a further material is added in a liquid carrier. The further material will provide for the bonding between powder particles. In contrast to a conventional method, where a fugitive binder is removed and the powder particles themselves sinter together and thus provide the material that join them, in the present invention, the material that joins the powder particles is provided as an independent material. It is a special aspect of the current invention that two different materials are required. One as the main body material and the second as the source for the binding material. Further, there is no movement of the powder particles after they have been placed, i.e., there is no mechanical mixing.

A preferred implementation is to provide a layer of powder and then to provide the further material within that layer and to repeat this process layer after layer according to a three dimensional printing method, such as is described in U.S. Pat. No. 5,204,055, mentioned above. According to another preferred implementation, rather than using 3D Printing, the liquid carrier is provided to powder packed in or around a mold.

According to one aspect of the invention, a solution of metal salt (for instance, an aqueous solution) is printed into a powder bed at locations where it is desired to bind the powder granules together. The salt solution accumulates at necks between the granules, due to the operation of surface tension. A constituent that originates from the salt solution forms at the necks and mechanically joins the granules together. The constituent may be crystallized salt itself, or it may be a metal that results from reduction of the salt or some species in between the transformation of salt into metal.

For instance, silver nitrate ($AgNO_3$) solution printed onto stainless steel powder precipitates at necks between granules as the solution dries. Another suitable salt is a Rochelle salt $C_4H_4KNaO_6 \cdot 4H_2O$ (sodium potassium tartrate).

In some cases (e.g. the rochelle salt and epsom salts), the precipitated crystallized salt alone is strong enough to maintain the shape of the part as it is subsequently infiltrated.

In other cases (e.g. silver nitrate), the crystallized salt is subsequently reduced by heating it in a suitable environment, which reduction causes the metal (e.g. silver) to deposit onto the powder. The conditions of reduction can be chosen so that the metal deposits onto the powder in a thin film. Regarding the reducing atmosphere, some salts require the presence of hydrogen or some other reducing gas in the environment. However, some salts require only that they be heated up and the compound itself disassociates into a metal and other byproducts. For instance, silver nitrate melts at 212° C. forming a yellowish liquid. At 440° C. it decomposes into silver, nitrogen, oxygen and nitrogen oxides.

Alternatively, rather than first drying the solution, the salt and a metal powder can be chosen such that upon contact with the metal powder, the salt in the solution reduces to metal, in the solution. A principal example of this embodiment of the method of the invention is where the salt and a portion of the metal powder undergo an electrochemical "displacement" reaction. As a result of this reaction the metal of the salt (or a portion of it) is deposited onto the metal powder.

This deposition of the metal from ionic solutions consists of adding electrons to the dissolved metal ions (of the salt). These electrons are provided by the metal powder as it partially dissolves into the salt solution. A specific example is when silver is the metal of the salt, e.g., silver nitrate, and copper is the metal of the powder. Another example is silver carbonate dissolved in ammoniated water undergoing a displacement reaction against molybdenum powder.

With both the reduction and the displacement reaction embodiments, in some cases, the body, after reduction of the metal, is not strong enough for its intended purpose, or for subsequent treatment. In some such cases, it is possible to heat the body further, to cause either sintering or melting of the metal that has come from the salt. This approach is possible when the powder in which the salt has been printed has a high enough sintering temperature, $T_{MAX}$, so that it will not begin to sinter or melt during the subsequent heat treatment.

In cases where the powder into which the salt solution has been printed does not have a high enough sintering temperature, the powder may be held together tightly enough by either the salt crystals, or reduced metal so that it can be removed from the original powder, settered in another, higher temperature powder, and then fired to either reduce the salt to metal, if reduction has not yet taken place, or to sinter or melt the metal from the salt to provide additional strength. It is important to note that only the small amounts of deposited metal are sintering or melting in this case, and not the primary metal powder of the body. Thus, many of the problems associated with conventional sintering are not present. In some cases, the crystallized salt form is not strong enough to remove from the surrounding powder but it is desired to remove the body from the powder at that crystallized stage. In those cases, it is also possible to add a polymeric binder to the salt solution that is printed. This polymer binder binds the printed part loosely, so that it may be removed and settered, and further heat treated, as discussed above.

As such, a preferred embodiment of the invention is a method for forming a body from powder using a three-dimensional printing process. The method includes the steps of: providing a layer of powder of a first material, granules of the powder layer contacting one another and printing on the layer of powder, a liquid vehicle that contains a salt that will cause the powder granules to be bound together. The steps of providing a layer of powder and printing a liquid on the layer are repeated additional times until a desired amount of printed powder has been provided. The printed liquid and powder are maintained under conditions such that a further material, which is different from the first material, and which originates from the salt solution, forms at interfaces between the powder granules, and binds adjacent granules to each other within each layer and between layers. The further material may be crystallized salt, or reduced metal. The maintaining step typically includes drying, and heat treating. The drying can occur in between successive steps of powder deposition, or after all or a larger part of the body to be formed has been formed.

According to a preferred embodiment, necks of the further material arise at the points of contact between the granules. The subsequent processing may included heat treating these necks to form metal films, or strong metal bodies.

According to another embodiment of the invention, again in a three dimensional printing process, the powder used is a metal powder, and the liquid vehicle contains a salt that is related to the metal of the powder such that upon contact, metal is deposited onto the powder, even while the liquid is present. This is typically by what is known as a displacement reaction.

Still another preferred embodiment of the invention is a method for forming a body from powder, comprising the steps of: providing a volume of powder of a first material, granules of the powder volume contacting one another. While maintaining the granules of the volume of powder substantially stationary relative to each other, a liquid vehicle that contains a salt, which will cause the granules to be bound together is provided in the volume of powder. The liquid and powder are maintained under conditions such that a further material, which is different from the first material and which originates from the salt solution, forms at interfaces between the powder granules, and binds adjacent granules to each other. This embodiment is not limited to a layered method, and can be used for molding.

The variations discussed above with respect to the three dimensional printing embodiments also are important for this more general embodiment. The further material can be crystallized salt, reduced metal, and the metal can be reduced according to a displacement reaction. Further processing can include removing the formed part from the original bed when bound by either crystallized salt, reduced metal or a binder, all of which arise at necks between the particles. Further processing can include elevated temperature treatment to sinter or melt the deposited salt or metal, along with settering, if necessary.

According to yet another preferred embodiment, the invention is a method for forming a body from powder with virtually no shrinkage during processing, comprising the steps of: providing a volume of powder of a first material, granules of the powder volume contacting one another; providing in the volume of powder, a liquid vehicle that contains a salt, which will cause the granules to be bound together; and maintaining the liquid and powder under conditions such that a further material, which is different from the first material and which originates from the salt solution, forms at interfaces between the powder granules, and binds adjacent granules to each other, and strengthens the body while shrinking no more than 0.5% linear.

According to still another preferred embodiment, the invention is a Solid Freeform Fabrication process, where powder and salt, are co-provided, which salt causes the powder particles to be bound together.

Yet another preferred embodiment of the invention is a method for forming a body from powder, comprising the steps of providing a volume of powder of a first material, granules of the powder volume contacting one another. A quantity of a salt is provided in the volume of powder, which salt will cause the granules to be bound together. The salt and powder are maintained under conditions such that a further material, which originates from the salt, adheres to said powder granules at interfaces between the powder granules.

Still another preferred embodiment of the invention is a laser method for forming a body from powder, comprising the steps of: providing a volume of powder of a first material, granules of the powder volume contacting one another. In the volume of powder, a quantity of a salt, is provided, which salt will cause the granules to be bound together. Laser energy is applied to the salt and powder under conditions such that a further material, which originates from the salt, adheres to the powder granules at interfaces between the powder granules.

Another preferred embodiment of the invention is a fused deposition method for forming a body from powder, comprising the steps of: providing a volume of powder of a first material, granules of the powder volume contacting one another; and providing a binder material, that includes in it a dissolved salt, which salt will cause the granules to be bound together. Using a fused deposition modeling step, the salt containing binder material is mixed with the volume of powder, and then extruded under conditions such that a further material, which originates from the salt, adheres to said powder granules at interfaces between the powder granules.

BRIEF DESCRIPTION OF THE DRAWINGS

These and other features, aspects, and advantages of the present invention will become better understood with regard to the following description, appended claims and accompanying drawings, where:

FIGS. 8A–8I is a schematic representation of steps of a displacement reaction embodiment of the invention where a layer of powder is provided (FIG. 8A), a salt solution is printed on a layer of powder (FIG. 8B), metal is reduced onto the powder by displacement reaction (FIG. 8C), joining powder granules within the layer, the solution is dried (FIG. 8D), another layer of powder is applied (FIG. 8E), additional salt solution is printed (FIG. 8F), additional metal is reduced onto the powder by displacement reaction, joining powder granules within and between layers (FIG. 8G), the second deposit of salt solution is dried (FIG. 8H) further joining the powder granules together within and between layers, followed by an optional heat treating step (FIG. 8I) which results in the reduction of more metal from salt;

DETAILED DESCRIPTION

In general, concentrated metal salt solution is used as a binder. After applying such a solution to the powder, the entire powder body is maintained at a temperature, below the sintering temperature of the powder, $T_{MAX}$, in a reducing atmosphere. Under appropriate conditions, a binder that originates from the salt adheres to the powder particles adjacent points where the powder granules contact each other and binds the regions that contain the salt. (It will be understood that the temperature at which a powder will begin to sinter also depends on the duration over which the powder is observed. As used herein, $T_{MAX}$, is the temperature at which the powder will sinter over a reasonable period of time for manufacturing purposes, on the order of less than one day.)

There are at least three different mechanisms that result in binding: (1) binding by unreduced salt crystals; (2) reduction of the salt into a metal resulting in a binding metal film; and (3) a displacement reaction, resulting in deposited metal, which binds the particles. With each of the reduction and displacement reaction embodiments, in cases where the deposited metal morphology does not result in adequate strength for the chosen applications, it may also be desirable to subject the reduced metal bearing body to subsequent heat treatment, to either sinter or melt the deposited metal.

Figure 1A:
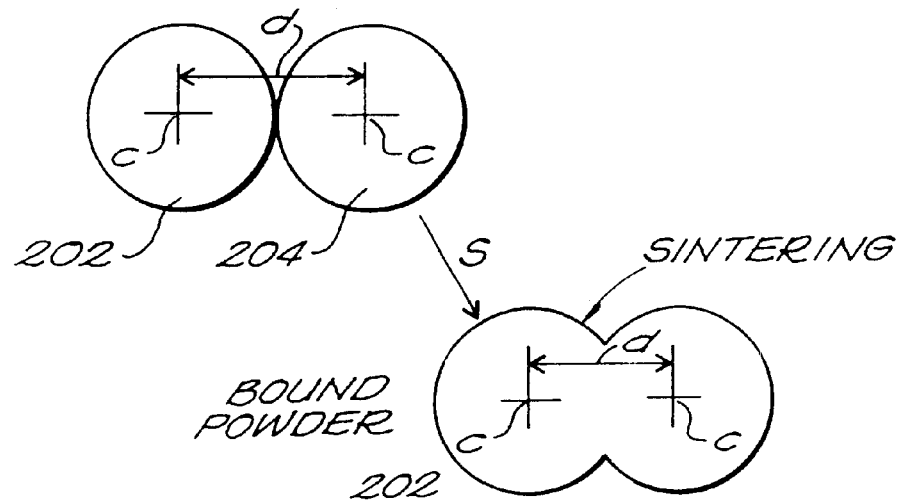
FIG. 1A is a schematic representation of a prior art method of joining loose powder together by sintering.
Figure 1B:
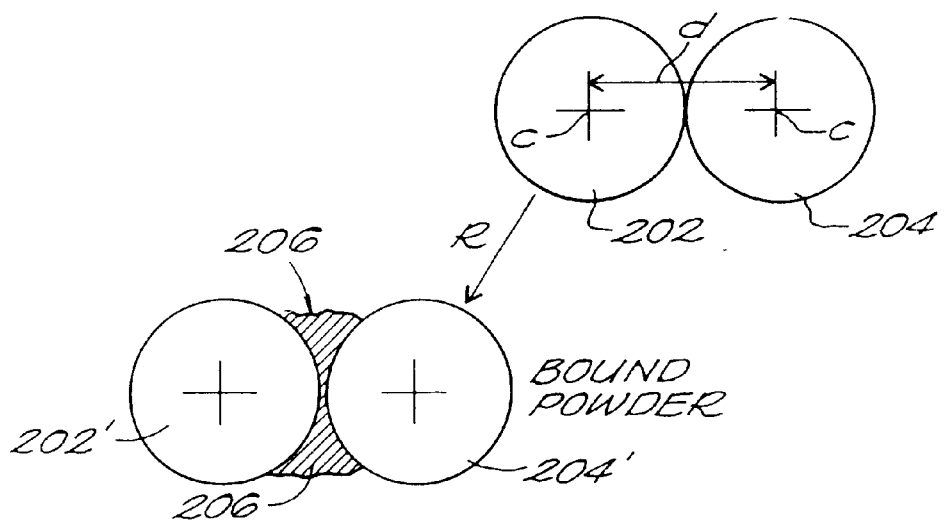
FIG. 1B is a schematic representation of a generic method of the invention, joining loose powder together by a constituent that originates from a salt solution.

A binder that originates from a metal salt has a great potential for low shrinkage, particularly as compared to a sintered part. With a metal or salt coating at the necks providing the interparticle strength, the powder particles (e.g., steel) themselves need not sinter. FIGS. 1A and 1B show, schematically, a comparison between a sintering method (FIG. 1A) and a salt based method (FIG. 1B).

As shown schematically in FIG. 1A, according to a prior art sintering method, loose powder particles 202 and 204 are heated to a temperature at which they sinter, along is processing path S. Due to migration of material from the particles to the necks, sintering reduces the total surface area of the body of powder, and also generally reduces the distance d between nominal centers C of the individual powder grains, thus causing the entire part to shrink along the axis along which the centers approach. In a three dimensional part, shrinkage is through three dimensions.

If, however, rather than sintering, the processing path R is followed, as shown schematically in FIG. 1B, then an additional constituent 206, which originates from an added salt solution, joins the powder particles 202' and 204'. Joining is not accomplished by joining of a portion of the particles themselves. Thus, there is little or no shrinkage.

Another advantage of the current invention is to make the skeleton less susceptible to shrinkage during thermal treatments. The driving force for shrinkage during sintering is the reduction of surface area that accompanies the formation of necks between particles. Creating necks by adding material substantially reduces this driving force. With the invention, it is possible to maintain shrinkage (linear) to below 2%, and even less, even as low as 0.1% For example, 60 micron spherical silver powder was found to shrink 1.1% when fired at a temperature of 650° C. in a furnace cycle with a total duration (heat, hold and cool) of approximately 3 hours under forming gas (5% Hydrogen, 95% Argon). In a parallel experiment, 60 micron spherical silver powder was saturated with 3.5 M solution of $AgNO_3$ in ammonia, dried, and then fired. When subjected to an identical firing cycle, this sample was found to shrink less than 0.1%. It is believed that silver necks formed by the reduction of the silver nitrate reduced the driving force for sintering, namely the propensity to reduce surface area, resulting in dramatically less shrinkage.

As mentioned above, several mechanical properties are thought to be strongly related to the degree of necking attained between the powder particles in the skeleton. For example, impact toughness and perhaps yield and tensile strengths are believed to increase as the degree of necking increases. When forming a skeleton by sintering, it is only possible to increase the degree of necking, and thus attain such improved properties, through increased sintering, which results in more shrinkage and more uncertainty in shrinkage. However, if these necks are formed or enlarged by the addition of material, such as by material from a salt solution, there is no inherent conflict between improvements in these properties and maintenance of low shrinkage.

The invention also has the advantage that the powder material is placed, and then remains stationary while the binder material is placed, or added. The powder material is not further mixed, agitated, moved, extruded, forced, etc. There is substantially no relative motion between particles. This is advantageous because it is well known and controllable how to place, transport and shape dry powder. It is more difficult and less certain how to handle powder that has been mixed with a liquid, such as a slurry. Further, as mentioned above, use of a slurry results in a lower packing fraction, lower density, and more inhomogeneity than using dry powder. Further, it allows total control over the location of placing the binder solution. This permits making a part of virtually any shape, according to the 3D Printing techniques.

Various embodiments of this invention are discussed below. In the discussion that follows immediately, the invention is illustrated with reference to a 3D Printing implementation. However, it is also possible to practice the invention using other powder technologies, such as molding, which is discussed after the 3D Printing discussion.

Recrystallization

According to a first embodiment of the invention, a solution of a liquid carrier that contains a metal salt is printed at selected regions of a layer of a powder bed, analogous to the means by which liquid polymer binders are printed, as described in U.S. Pat. No. 5,204,055 Sachs et al., referred to above. The printing technique is described in detail in connection with FIGS. 2A, 2B, 2C, 2D and 2E, at col. 4 of the U.S. Pat. No. 5,204,055.

With one variant of this first embodiment, (referred to herein as the "recrystallization embodiment") the liquid dries completely, or almost completely away, leaving behind a recrystallized film of salt. The salt film itself binds to the powder material, and to other salt particles, forming bridges between the powder particles of a single layer, and between powder particles of adjacent layers, as shown in FIG. 2F.

Turning to the beginning of the process, a first layer of powder is provided, and a pattern of the binding liquid is printed thereon. The pattern is provided in regions where it is desired to join the powder particles to other particles in the same layer, and also to particles in the layer that has been laid before the current layer. After the current layer has been printed with the solution, a next layer of powder is provided, and this next layer is also printed upon, again in regions where it is desired to join the next layer to the previously printed layer, and within the next layer.

The '055 Patent mentioned above discusses using different binders, including polymeric resins and colloidal silica. The present invention uses a novel binder solution that contains a metal salt. This solution acts as a binder in a novel fashion, as discussed below.

Figure 2A:
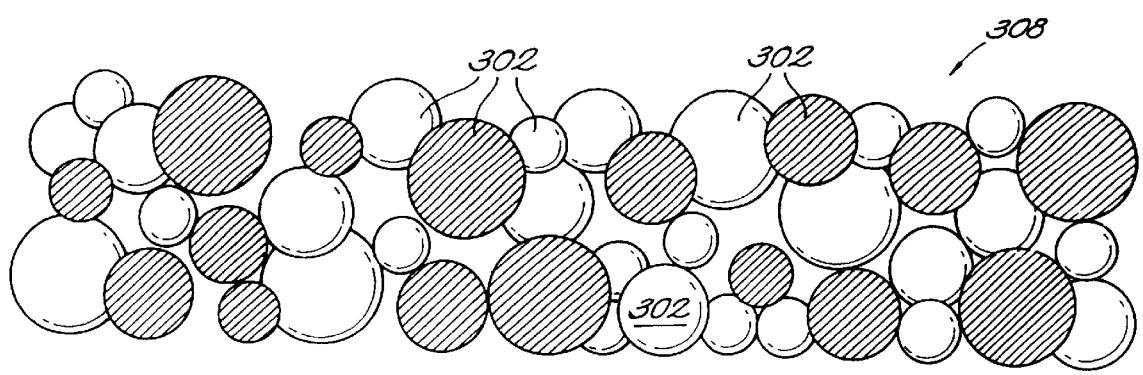
FIGS. 2A–2F is a schematic representation of steps of an embodiment of the invention where a layer of powder is provided (FIG. 2A) a salt solution is printed on a layer of powder (FIG. 2B), dried (FIG. 2C), another layer of powder is applied (FIG. 2D), additional salt solution is printed (FIG. 2E), and the salt solution is dried to crystals, joining powder granules within and between layers (FIG. 2F)
Figure 2B:
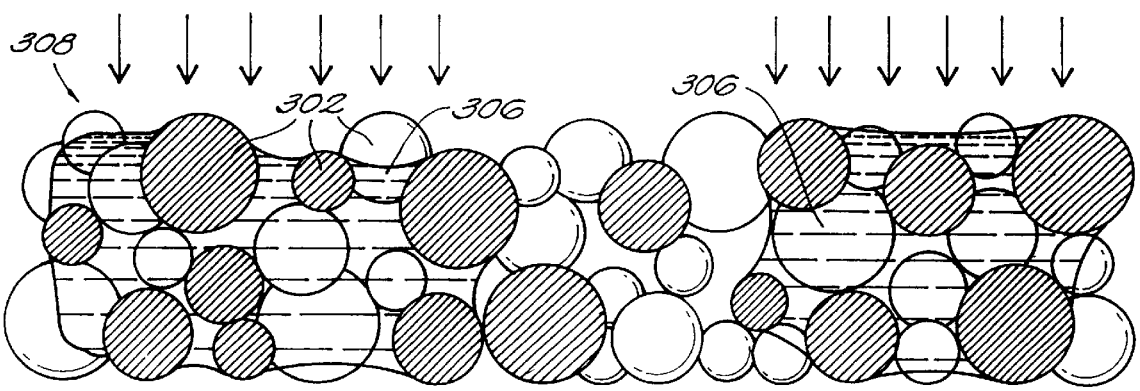
Figure 2C:
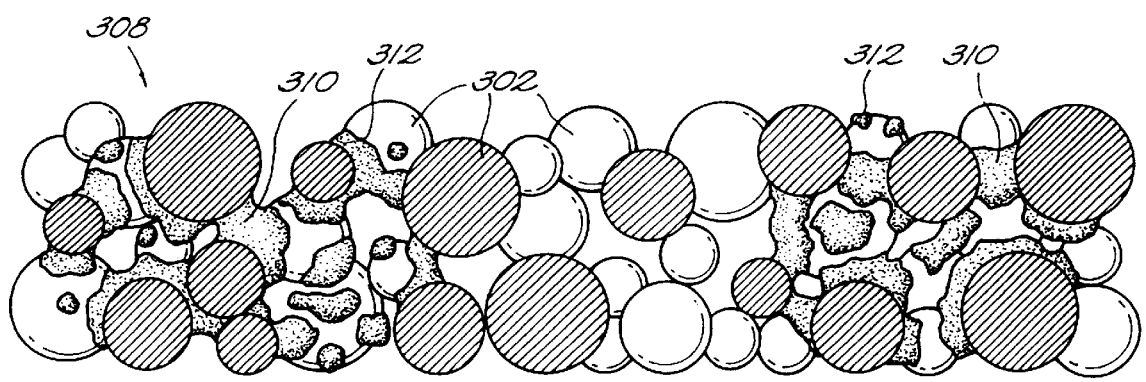
Figure 2D:
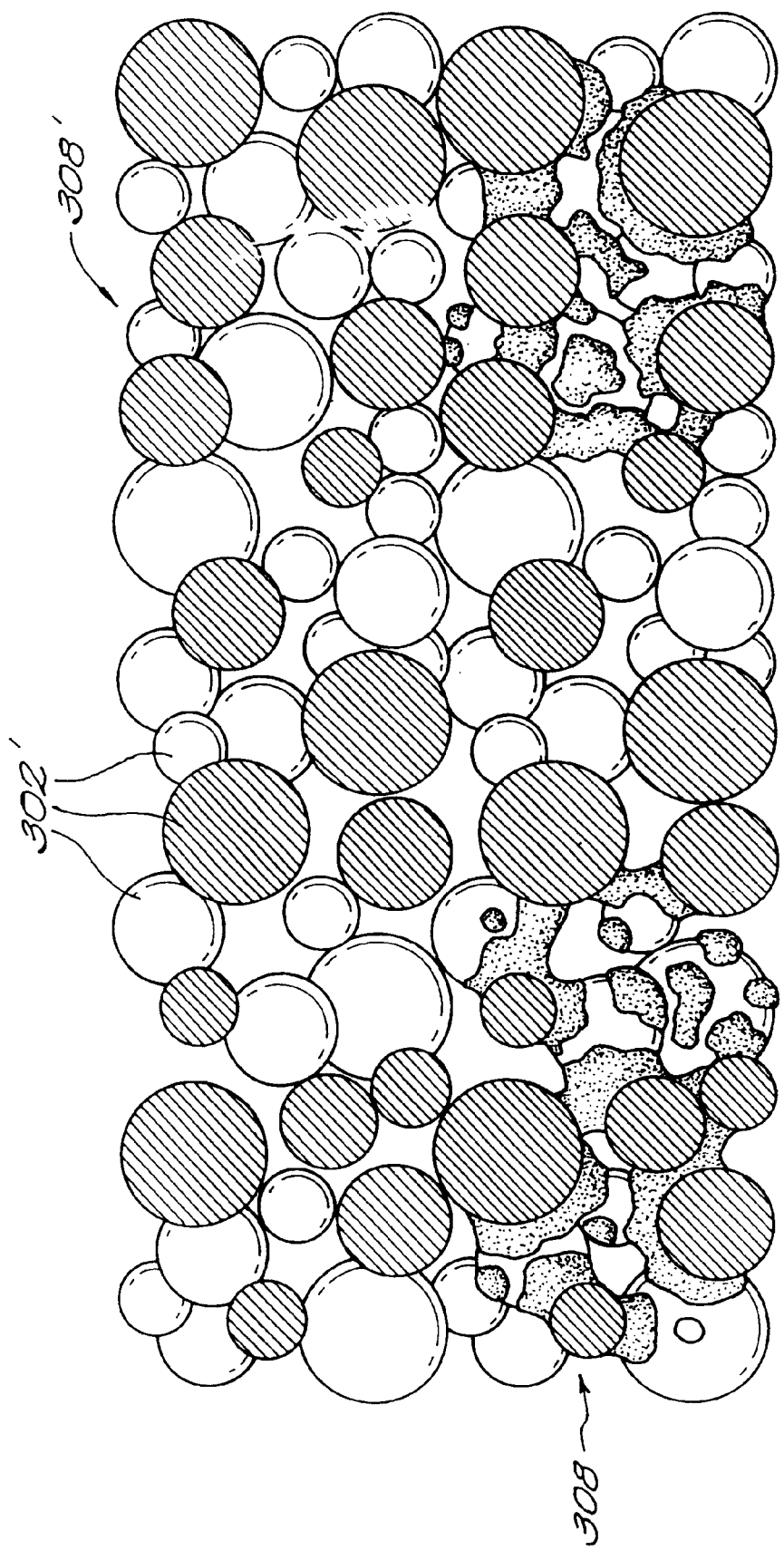
Figure 2E:
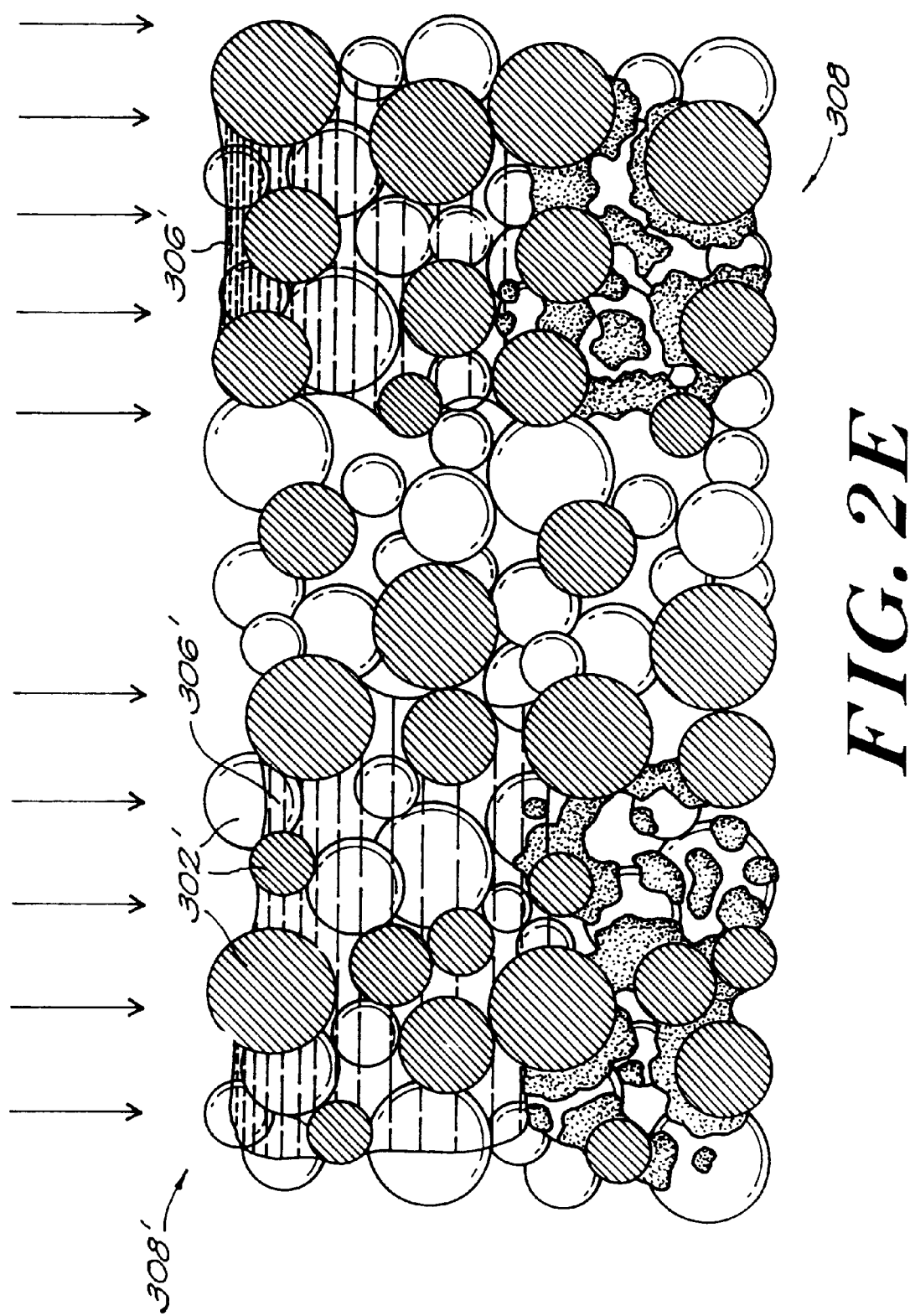
Figure 2F:
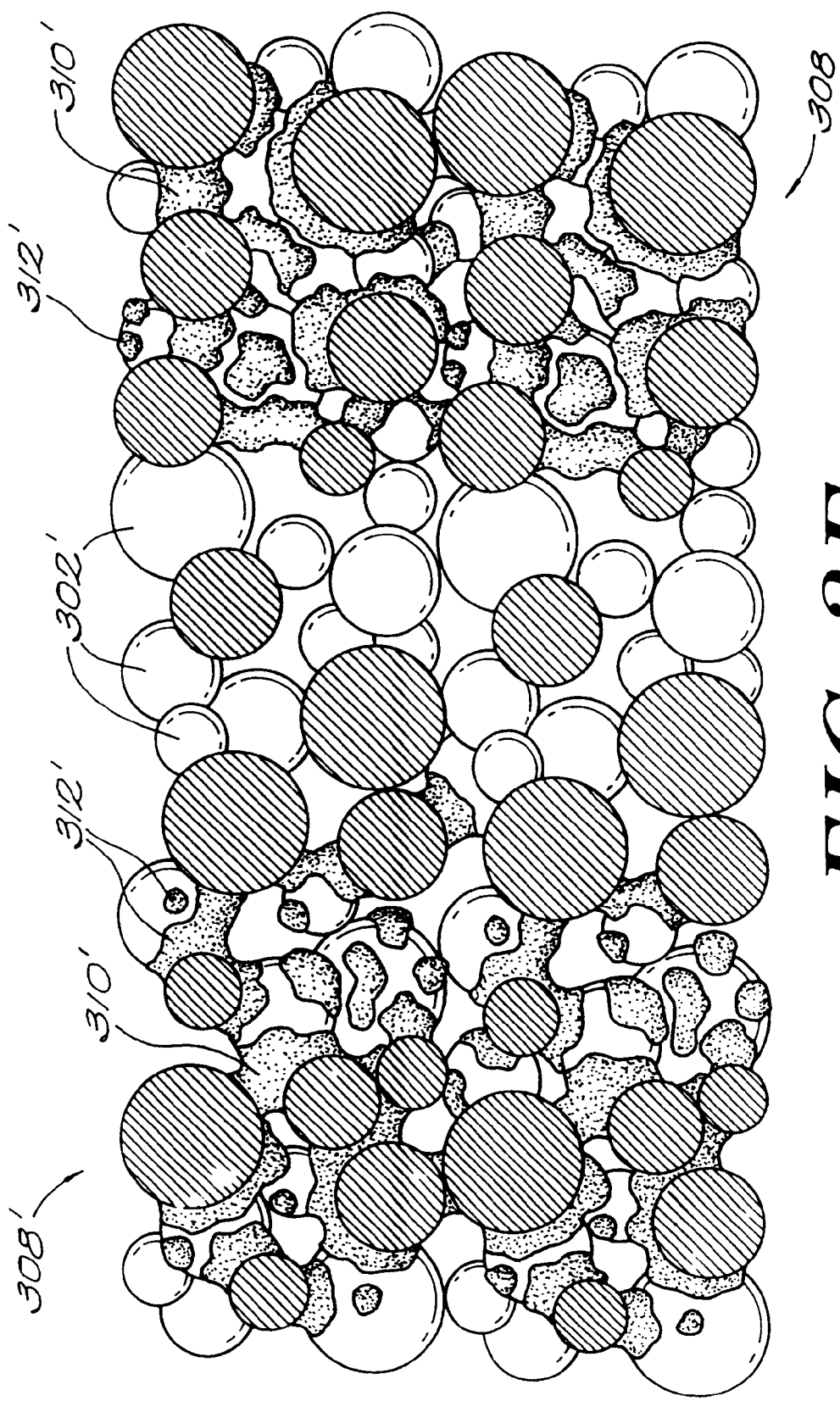
Figure 3:
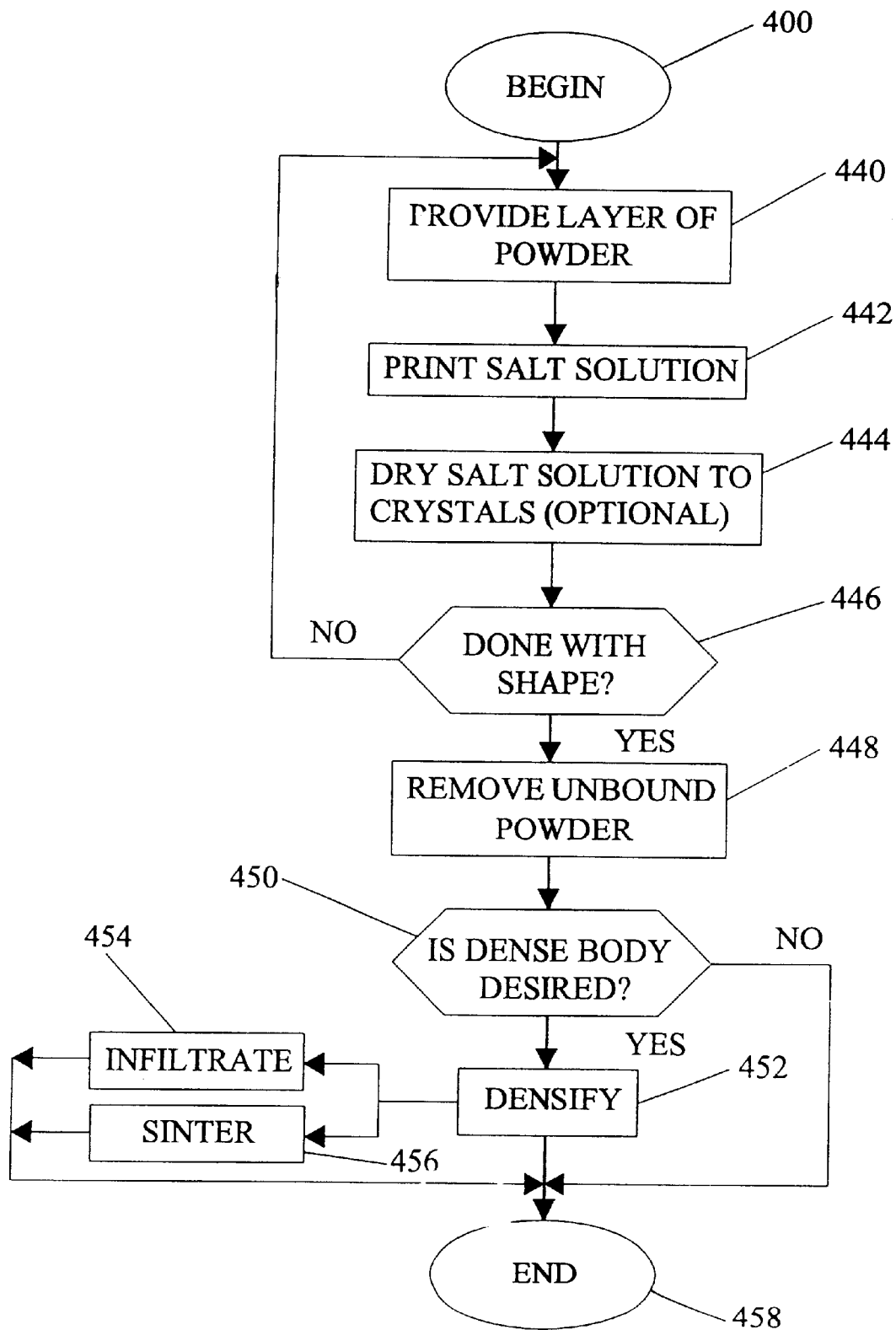
FIG. 3 is a schematic representation, in flow chart form, of a recrystallization embodiment of the method of the invention.

The overall method of this embodiment of the invention is shown schematically with reference to FIGS. 2A, 2B, 2C, 2D, 2E and 2F and in flow chart form with reference to FIG. 3. The process begins 400 with the step of providing 440 a layer of powder, as described above. (The powder particles 302 are shown to be spherical, which is a preferred embodiment. The size distribution is "monomodal" meaning it has an average size distribution and some spread around it but the spread is controlled. In another preferred embodiment, the size can be uniform. However, it is also possible to use a range of sizes of particles, and further, to use particles that are not spherical.)

Each layer 308 is typically at least three particles thick, due to issues of powder flowability and layer spreadability. Typical deposited layers can also be thicker. However, as used herein, "layer" means that amount of powder material that is deposited and then printed upon, before an additional such layer is deposited on top of the first layer.

Figure 4:
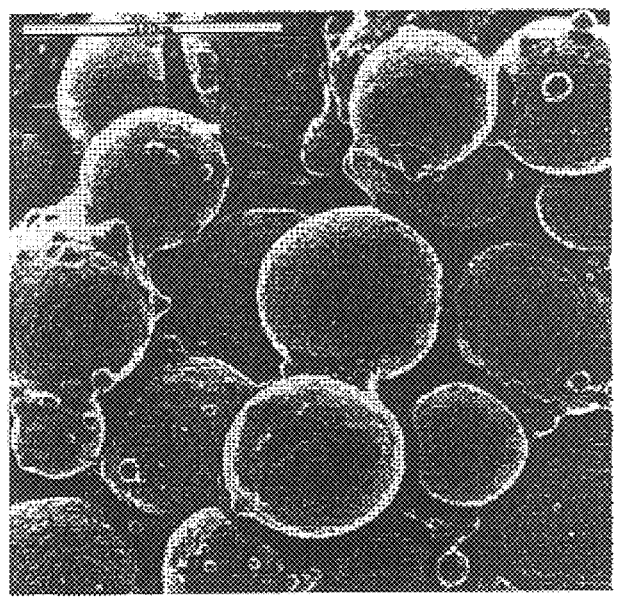
FIG. 4 is an electron micrograph of a cross-section of a rochelle salt bound product with a skeleton of stainless steel powder.
Figure 6:
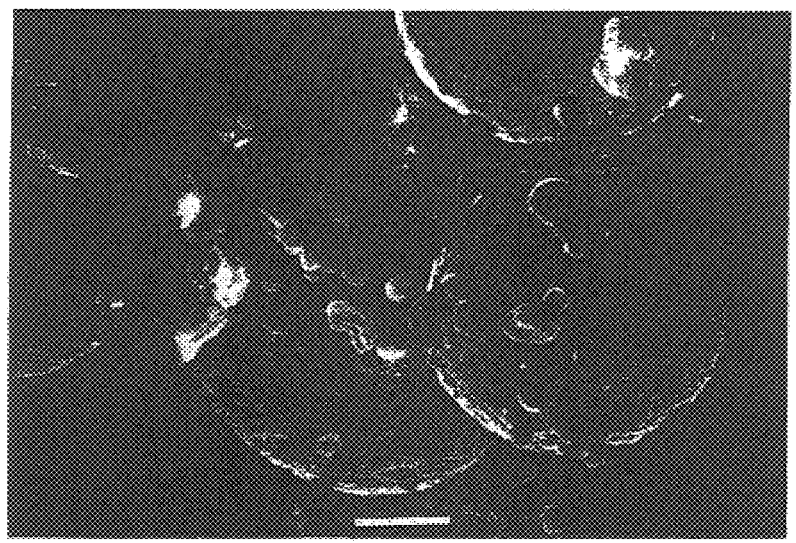
FIG. 6 is an electron micrograph of a cross-section of a silver nitrate salt bound product with a skeleton of steel powder.

The next step is to print 442 a salt solution 306 in the regions of the powder particles 302 that will be bound, as shown in FIG. 2B. As the solution optionally dries 444, as shown in FIG. 2C, it and, consequently, the dissolved salts 312, are drawn by capillary action to the regions 310 where adjacent powder particles 302 touch each other. (The volume of crystallized salt is exaggerated in FIG. 2C for purposes of illustration. FIGS. 4 and 6 are electron micrographs of actual samples that show the scale of constituents. FIG. 4 shows rochelle salt printed on steel powder and dried. FIG. 6 shows silver nitrate.) As the liquid dries away, salt particles 312 are left at the necks 310.

A query is conducted to determine 446 if the full shape has been built up. If not, the method of the invention returns to the step 440 of providing a layer of powder, as shown in FIG. 2D. A new layer 308' is provided on top of the first layer 308. A salt solution 306' is again provided 442 to the locations of the layer 308' where it is desired to join grains of powder to each other within the layer, and between layers, as shown in FIG. 2E. It should be noted that as shown in FIG. 2E, the location of the salt solution applied to the layer 308' is essentially identical to the locations where the salt solution was applied to the layer 308. This would not typically be the case for all adjacent layers, and again is shown this way only for simplicity. Typically, variations arise between layers, in order to define the desired shape, which will have a different cross-section for some adjacent layers. Further, as shown in these figures, the powder particles in adjacent layers are in identical locations. This also would not be the case in an actual powder body, but is shown only to simplify the figures.

The salt solution 306' also dries 444 to form a recrystallized film of salt.

Conducting the drying step 444 at exactly this point in the process, to arrive at the condition shown in FIG. 2F, with dried salt particles 312' is optional, and need not be performed every cycle. For instance, the salt solution may include thickening agents such as methyl cellulose or gelling agents such as Alginates or animal gelatin that will cause the solution to become substantially immobilized. In such a case, drying could take place later, such as after the entire part is formed. In many cases, this will result in time saving for part forming.

According to this recrystallization embodiment, after the shape of the entire part is made up of printed, and dried salt solution, the unbound powder is removed 448, such as by vibration, or other appropriate techniques that are not so vigorous as to disrupt the salt film structure.

If it is determined 450 that a fully dense body is desired, following the powder removal stage, the three dimensional shape is densified 452, typically by being infiltrated 454 with an infiltrant, according to any known infiltration technique and the process ends 458. The result is a three-dimensional body that is fully dense, and that has shrunken very little, if at all, from the size and shape into which the solution was printed.

Typically, with the recrystallization embodiment, a suitable infiltrant is an epoxy. Epoxy is liquid at temperatures that are low enough so that the salt films will not degrade. Many epoxies are liquid at room temperature. Further, salts are non-wetting for most metals. Thus, a metal infiltrant has difficulty infiltrating past the salt regions in the body. The epoxy wets the skeleton and can be infiltrated under the action of capillarity from below or by gravity from above.

Salt candidates for the recrystallization embodiment should impart sufficient strength to the dried body so that it can withstand processing steps, such as infiltration. The choice depends on the composition and size of the powder material, the infiltrant, and the size of the body.

Example: Rochelle salt $C_4H_4KNaO_6 \cdot 4H_2O$ (sodium potassium tartrate was dissolved in water at a concentration of 0.7 M. The rochelle salt solution was administered to stainless steel powder and allowed to dry, and produced a strong body. FIG. 4 is an electron photo micrograph of a cross section of such a body, showing clearly the formation of salt bridges between larger, spherical particles. The salt may be dissolved in water at a concentration of up to 67.8 g of anhydrous salt per 100 g water (at 20° C.). Typically, rochelle salt has a melting point of approximately 70–80° C., and, therefore, if an epoxy is to be used as an infiltrant, it must cure at a temperature below 70° C.

Other polymeric infiltrants are possible. For example cyanoacrylates (super glue) may have appropriate properties.

Another suitable salt is magnesium sulfate $MgSO_4 \cdot 7H_2O$ (Epsom salt). Magnesium sulfate is relatively safe and has a melting point above 200° C. It has a high solubility in water. Parts bound with magnesium sulfate showed a strength that is high enough to withstand careful handling. They can be infiltrated with epoxy, as discussed above.

Thus, to summarize, the recrystallization technique can be applied to any powder material, as long as the powder doesn't dissolve in the salt solution. Any infiltrant must cure at a temperature below the melting points of the salt and the powder.

Reducing Embodiment

According to another embodiment of the invention, (referred to herein as the reducing embodiment), a salt solution is provided to a powder bed as described above in connection with the recrystallization embodiment. The method steps of a first variant of this reducing embodiment of the invention are shown in flow chart form with reference to FIG. 5A. In general, the reducing embodiment of the invention may be identical to the recrystallization embodiment, up to the step 444 where the salt solution has been printed at every layer, and then optionally dried. At this point, rather than removing 448 the unbound powder from the bound part, an atmosphere is provided 502 and conditions are provided 504 that will result in reduction of the metal from the salt. The atmosphere may be a reducing atmosphere, or, in an appropriate case, an inert atmosphere, as discussed below. For this reason, the reducing atmosphere step 502 is indicated as "optional."

Figure 2G:
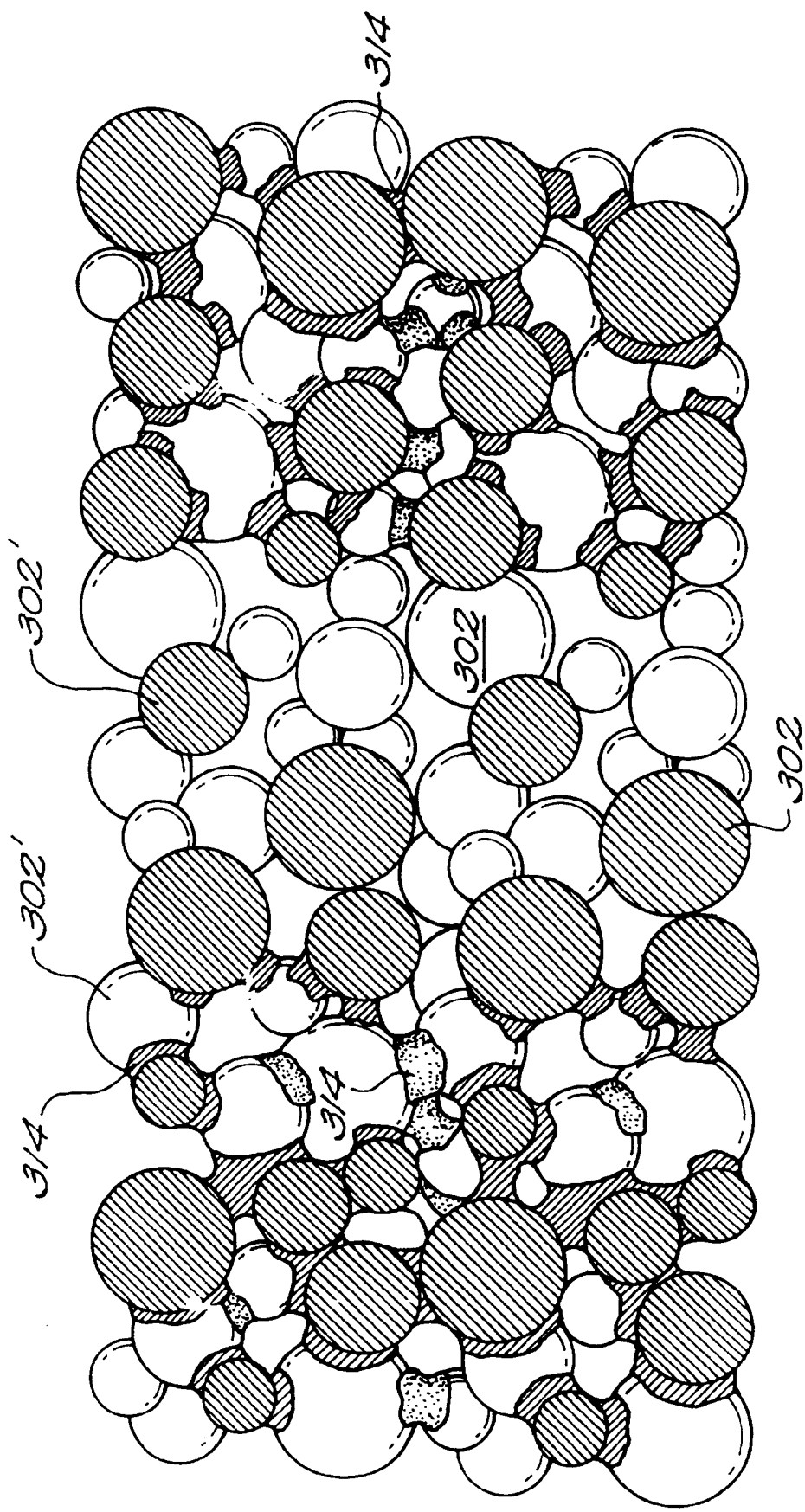
FIG. 2G is a schematic representation of a step of a reduction embodiment of the invention where the dried salt crystals shown in FIG. 2F are reduced to metal, after heat treatment.
Figure 5A:
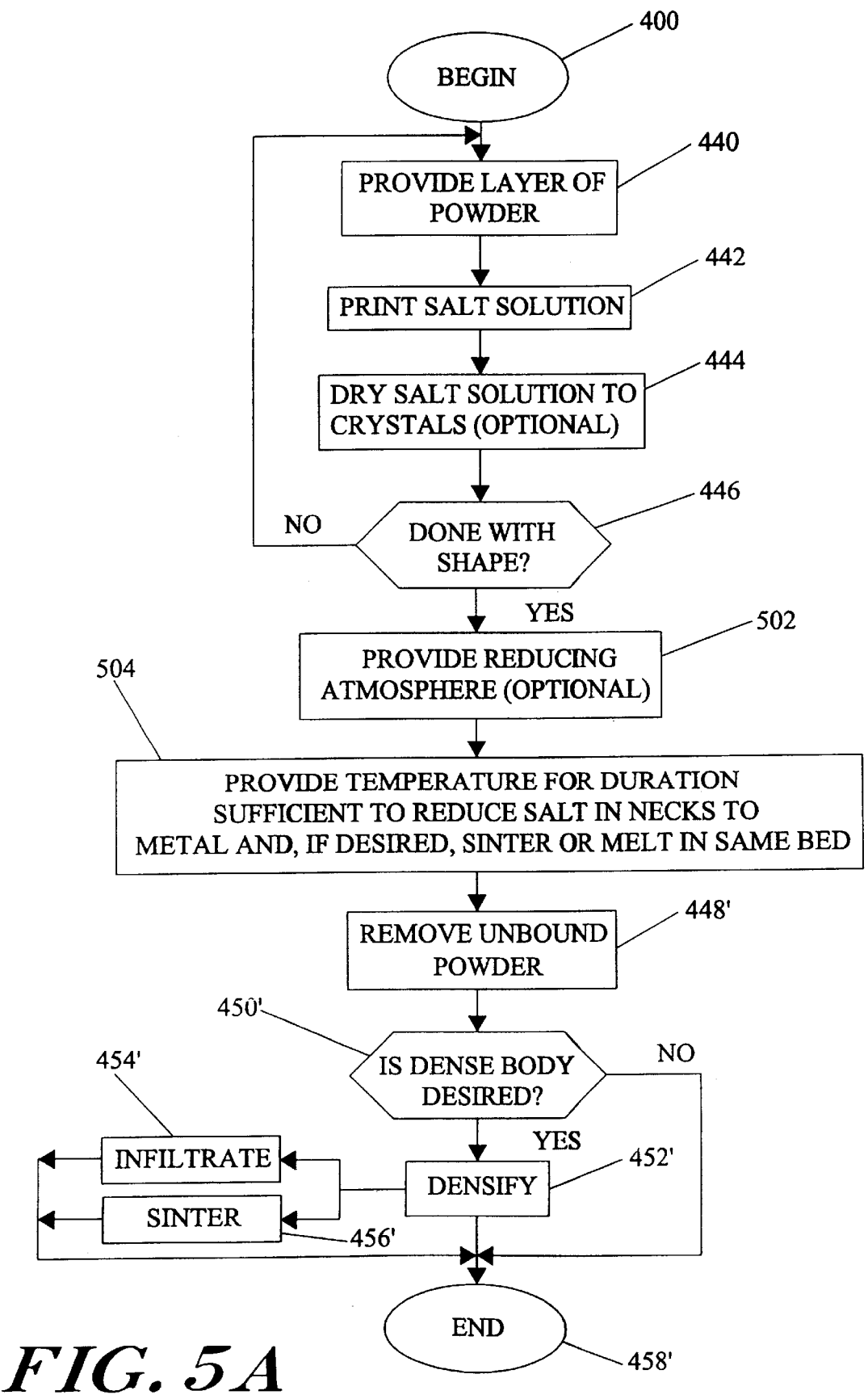
FIG. 5A is a schematic representation, in flow chart form, of a reduction embodiment of the method of the invention, where all of the heating of the body is conducted in the original powder bed.

In a first variant of the reducing embodiment of the invention, shown in FIG. 5A, all heat treating processing of the body is conducted in the original powder bed. In general, the part is maintained 504 in an appropriate atmosphere, for a duration, and at a temperature, that is sufficient to cause metal of the salt to reduce into metal, preferably forming a film 314 on the particles 302, 302', which film joins the particles together (FIG. 2G). The temperature and duration of heating are maintained below $T_{MAX}$, that which would result in any sintering of the powder particles 302 themselves. After the heating step 504, which provides structural strength to the body, the steps of the method are identical to those of the recrystallization embodiment. The unbound powder is removed 448'. An infiltrant may be provided 454', or not, as is desired 450'.

Figure 11:
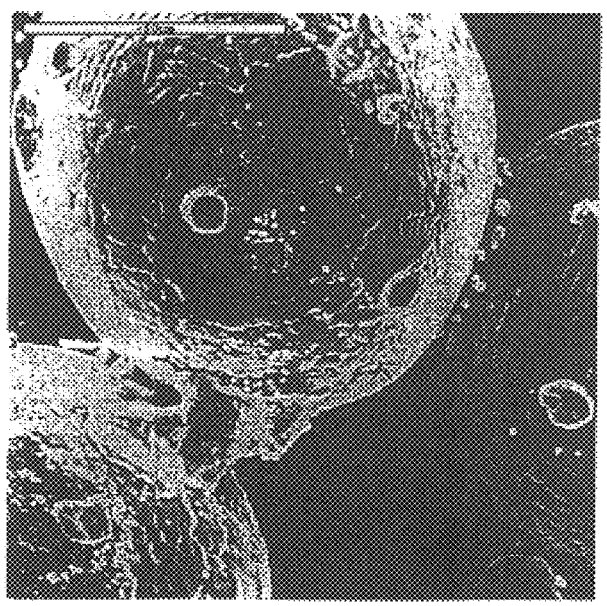
FIG. 11 is an electron micrograph of a cross-section of a skeleton of steel powder, with copper metal at the necks between powder granules, the copper derived from copper nitrate solution, where the product was dried and fired at 480° C., to reduce but not melt the copper.
Figure 12:
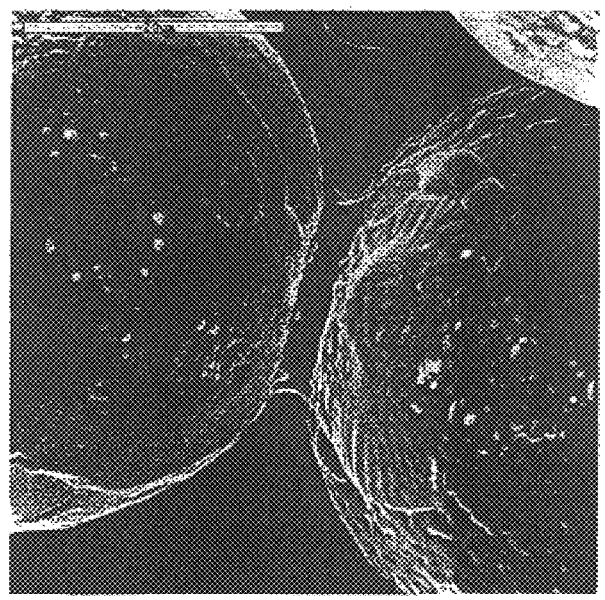
FIG. 12 is an electron micrograph of a cross-section of a copper bound product with a skeleton of molybdenum powder, the copper derived from copper nitrate solution, where the product was dried and fired at 1110° C., to melt the copper.

In some cases, reduction alone of the metal does not provide sufficient strength. There may be particles of reduced metal formed, but these particles are only loosely adhered, if at all, to the powder. (An example of this condition is shown in FIG. 11, which is an electron micrograph of copper particles that have reduced from a copper nitrate solution onto steel powder.) Any such metal can contribute to binding the powder if subsequent heat treatment causes these particles to join the metal powder at the necks. The heat treatment may cause the metal of the salt, after having reduced, to sinter together, thereby imparting additional strength, toughness, etc. to the body. It should be noted that it is not the main constitutive powder particles of the body that are sintering, but only the deposited metal particles, that originated in the salt. There is no appreciable shrinkage of the overall body associated with any such sintering. Further heat treating, if desired, may even cause this metal to melt. (An example of this condition is shown in FIG. 12, which is an electron micrograph of copper necks that have reduced from a copper nitrate solution onto molybdenum powder, which copper has been fired at 1110° C. after reduction, to melt.) All of these heat treating steps are shown in FIG. 5A as a single heating step 504. It will be understood, that, depending on the circumstances, this step may cause the metal from the salt only to reduce, or to reduce and sinter, or even to melt.

While it is part of the advantage of the invention that the salt can be reduced in the original powder bed, it is also possible to remove the crystallized salt bound part from the powder bed and then reduce it or otherwise heat treat it, as discussed below in connection with FIGS. 5B and D. This may be advantageous in some circumstances.

The atmosphere under which reduction step 504 takes place may be an inert atmosphere or it may be a specially designed reducing atmosphere, for instance a forming gas atmosphere of hydrogen and argon. Other examples of reducing atmospheres include pure hydrogen, and an inert gas with some carbon monoxide content. Some metal salts reduce without the need for an added reducing agent, such as hydrogen. For instance, silver nitrate will reduce without added hydrogen, under certain circumstances.

An advantage of this original powder bed variant of the reducing embodiment is that the elevated temperature step is conducted with the forming part remaining in the original powder bed. Thus, the powder bed provides an automatic and perfectly shaped support for delicate features of the part. Setting is not required.

This is advantageous over the normal practice of sintering and setting for at least three reasons.

1.) No part transfer must be made and thus delicate features need not be disturbed.

2.) It is always a challenge in setting to pack the powder properly and reproducibly. If the powder is not packed to a high enough density, gravitational slumping can still occur. If the powder is packed to too high a density, it may not be sufficiently compliant to allow the shrinkage that accompanies sintering (in the conventional method). This is an especially delicate point in the process, as it is sensitive to the geometry of the tool. For example, a solid block is not too much of a problem. However, setting and sintering a thin walled tub is a problem. The tub will have setting powder packed around it and inside it. If the powder inside is too tightly packed, the tub won't be able to decrease in size. In fact, if the walls of the tub are thin, this effect may happen even if the setting powder is packed properly.

3.) Because shrinkage is being reduced or eliminated (since there is no sintering of the main body of powder), the geometric sensitivity that may be caused by a setting powder is reduced or eliminated. Thus, if setting is desired for some other reason it can be more advantageously accomplished.

The reduction embodiment (and the displacement embodiment discussed in more detail below) is particularly beneficial for situations in which a porous body is desired, and an infiltrant will not be used. The reduction embodiment is beneficial in some circumstances, as compared to the recrystallization embodiment, because the reduced metal film typically is stronger than the precipitated, unreduced salt. Further, many crystallized salts are subject to degradation by moisture, being soluble in water. The reduced metals are not subject to such degradation. An example of such products are a porous filter, catalyst support, heat spreader (for a liquid) and flow diffusers.

A metal salt suitable for use with the original powder bed reduction variant of the invention preferably possesses the following properties:

1) reducible, to elemental metal and gaseous byproducts, either in the presence of an added reducing agent (such as hydrogen), or without any such reducing agent;

2) reducible at a temperature below $T_{MAX}$, the temperature at which the metal powder begins to sinter; and 3) high solubility in any reasonable liquid vehicle, such as water or alcohol.

Reduction to elemental metal and gaseous byproducts prevents undesirable residues from being left in the part. Any gaseous byproducts are carried out with the furnace gases. Ideally, the reduced metal does not have a detrimental effect on the overall mechanical properties of the part. The reduction must occur at a temperature below $T_{MAX}$ to permit easy part retrieval. Otherwise, the unbound powder begins to sinter. (Other variants of the invention are discussed below when the reduction does not occur at a temperature below $T_{MAX}$ of the original powder bed.) Ideally, the reduced metal will have a film-like morphology and be adherent to the powder. Further, it is desirable to have as much of the reduced metal at the necks as possible to provide greater strength.

Finally, the salt must be soluble enough in a suitable liquid carrier to provide sufficient metal content in the binder.

It may be desired to use the embodiment of the invention shown with respect to FIG. 5A with powder that has a relatively low sintering temperature. In that case the salt should preferably reduce to a coherent continuous film that provides adequate properties, such as strength, at a temperature below that powder sintering temperature. For example, using silver nitrate as the salt, as described below, silver metal film is deposited at temperatures of about 450° C., to form strong necks, which temperature is well below the sintering temperature of many useful metal powders. Such salts are advantageous because reduction alone results in adequate strength, without there being any need to resort to sintering or melting the metal from the salt (which typically (for the examples set forth herein) occur at higher temperatures than reduction).

In many cases, it will be desired to infiltrate the skeleton to form a fully dense article. The ideal infiltrant will completely fill the pore space, exhibit good flow and wetting of the pore structure, and will not leave a residue. In addition, the melting point of the infiltrant should preferably be lower than the sintering temperature of the base metal powder. More precisely, the temperature required for the infiltration process should preferably not exceed the melting point of either the base powder or the necks. If a metal is used as the infiltrant, then the melting point of the metal should preferably be lower than either of these temperatures. If an epoxy is used for the infiltration, then the curing temperature should preferably be lower than either of these temperatures.

However, there are situations where it is not necessary that the infiltration occur at a temperature below the melting point of the base powder or the necks. Experience has shown that in some cases, an infiltrant can be used that has a higher melting temperature than the metal of the necks. It is believed that the body retains its shape due to the capillary stress caused by the liquid infiltrant. This stress holds the body together until cooling solidifies it.

A similar phenomena occurs in some instances when an infiltrant is used that would be expected to dissolve the metal of the necks. Again, it is believed that capillary stress draws the body together, despite the fact that the infiltrant may have dissolved the metal of the necks. For instance, a preferred salt to use is silver nitrate, which results in a silver film that joins the powder particles together. Copper is a common infiltrant. Copper and copper alloys can be used to infiltrate a silver bound skeleton, despite the fact that the copper alloy may dissolve the silver. In other cases, the rate of dissolution of the metal neck may be sufficiently slow to allow for infiltration and solidification to take place before the neck has dissolved.

Beneficial results can also be obtained with tin alloys as infiltrants. Other infiltrant candidates include zinc and zinc alloys, lead/tin and silver brazing alloys. It may also be beneficial to use a flux, to aid in wetting the skeleton with the infiltrant.

Thus, issues for the designer to consider regarding infiltration include the following: the melting point of the infiltrant should generally be less than the sintering temperature of the powder, as discussed above. The metal of the infiltrant should preferably not dissolve the metal from the salt. The infiltrant should preferably wet both the powder and the metal of the salt, or a flux should preferably be used to aid wetting. The infiltrant should not result in dimensional changes of the infiltrated product. Additional concerns for the designer relate to the finished product. It should be tough enough to withstand the stress of the desired use, such as molding, or filtering, etc.

It is important that the deposited metal strongly bond to the powder particles. In many cases where the metal forms a thin film on the powder particles, such a strong bond is present. Such strength may also arise in situations where films do not form, such as when discrete regions of metal form, particularly at the necks.

As mentioned above, silver nitrate melts at 212° C. and remains in a liquid state up to the temperature of 440° C., when, from its melted state, it decomposes. More specifically, at this temperature, oxygen, nitrogen and nitrogen oxides are evolved while silver adheres on the stainless steel powder. It is hypothesized by the present inventors that the fact that the component (molten silver nitrate) prior to the formation of the solid silver is in liquid form, is of great importance in the resulting adhesion between silver and steel.

The above hypothesis is supported by the following experiment: when a solution of silver carbonate is printed on 316 stainless steel powder and fired in forming gas at 450° C., the printed part has no strength. It is interesting to note that after this firing, the resulting element at the necks is the same as in the case of silver nitrate: nothing but silver. The path to the formation of silver is quite different in these two cases.

Silver carbonate, in contrast to silver nitrate, does not melt. At around 220° C., it decomposes to silver oxide ($Ag_2O$) and carbon dioxide ($CO_2$). The resulting silver oxide also does not melt. It decomposes to its two elements. It starts to decompose as soon as it is formed and its decomposition rate increases as the temperature increase. (It is known from the literature that the decomposition of silver oxide starts at 189° C. and becomes rapid at 250° C.–300° C.). It should be noted that neither of the two chemical compounds that precede the formation of silver is in a liquid state at any point.

It should be emphasized that the existence of a compound in a liquid state prior the formation of the metal is not sufficient to produce adhesion between the formed metal and the metal powder. For instance, when a solution of copper nitrate is printed on 316 stainless steel powder and it is fired in forming gas at 480° C., there is no strength. Copper nitrate melts at about 114.5° C.; at around 180° C. it reduces to copper oxide (CuO) which is solid (its melting temperature is about 1326° C.). CuO reduces to copper. Copper does not adhere on the stainless steel powder. This agrees with the above hypothesis: it is important that the component that immediately precedes the formation of metal is in liquid form.

Other factors should be considered by the designer in choosing potential candidates for salt binder systems. An important condition to consider is the minimum temperature at which the metal from the salt will reduce. One condition that must be satisfied for the salt to reduce to metal is a lowering in the Gibbs free energy of the system. Such a condition can be calculated, taking into account the reactants, products, atmosphere and temperature, with the aid of thermodynamic data. Such data can be obtained from tables, such as the JANAF thermochemical tables published by the American Chemical Society and the American Institute of Physics for the National Bureau of Standards. Such thermodynamic calculations can also be performed with the aid of computer programs such as "Thermo-Calc" developed at the Royal Institute of Technology, Stockholm. In most cases, an increase in processing temperature will favor a reduction of the salt to metal. Thus, such calculations can be used to determine a minimum temperature required for this reduction. For instance, Therma-Calc shows that nickel nitrate reduces to pure nickel when fired at around 850° C. in the presence of hydrogen and this has been confirmed by experiment. This minimum temperature can be used as a guideline to assess the viability of candidate salts, and to help choose among the variants discussed above and illustrated in FIGS. 5A–5D. It should be kept in mind that achieving reduction at a relatively low temperature will provide the designer with more choices of powders for the body of the material. Further, it will make it possible to use more of the variants of the method of the invention shown in FIGS. 5A–5D. It should be noted that such thermodynamic calculations do not provide any information about the rate of the reaction. They also do not predict the morphology of the resulting product and therefore cannot predict whether the metal will form as a film, or granules, and whether it will adhere or not to a substrate.

One issue that may arise when reducing a salt in a furnace environment, concerns the transport of gases into and out of the porous skeleton. If a particular salt requires hydrogen to reduce, then hydrogen must be transported in through the skeleton to promote the reduction. This may require substantial amounts of hydrogen. Further, for safety considerations, the hydrogen is often provided in diluted form, for example, utilizing the mixture of 5% hydrogen and 95% argon, commonly known as "forming gas". In this form an even larger quantity of gas is required to supply the required hydrogen. Further, if the byproducts of the reduction are gaseous, they must be able to transport out of the skeleton. Thus, in the practice of a reduction by hydrogen or other gas, sufficient gas flow must be provided and sufficient time allowed for the transport of these gases into and out of the skeleton.

For example, in the reduction of copper nitrate as discussed below in connection with the variant of the method of the invention shown in FIG. 5A, a 1.75 molar solution of copper nitrate (($Cu(NO_3)_2 \cdot 3H_2O$) is used to provide the copper to bind molybdenum powder, as shown in FIG. 12.

If it is assumed that the powder is packed to 60% by volume, and that the remaining space is filled with salt solution, each liter of powder bed will consist of 0.6 liters of powder and 0.4 liters of salt solution. The 0.4 liters of salt solution will contain 0.4*1.75=0.7 moles of salt. The salt will first decompose to CuO and then reduce to Cu. Thus, each mole of salt will require 1 mole of Hydrogen gas to effect a reduction. Each liter of powderbed, containing as it does 0.7 moles of salt, will require 0.7 moles of Hydrogen gas. As a mole of gas occupies 22.4 liters at Standard Temperature and Pressure ("STP"), each liter of powderbed will require at least 0.7*22.4=15.7 liters of Hydrogen gas at STP.

Some salts reduce under a thermal treatment without requiring the presence of hydrogen. This is advantageous in that no considerations need be given to supplying the required amount of gas or allowing it to transport into the skeleton. However, if there are gaseous byproducts, sufficient time must still be allowed for the transport of those gaseous byproducts out of the skeleton.

The foregoing discussion has assumed that any heating of the powder article, either for causing 504 reduction of the metal from the salt, or its sintering or melting would be conducted in the original powder bed into which the salt solution had been deposited. While such a practice is a very advantageous embodiment of the method of the invention, it is not always the most advantageous embodiment. In some cases, the reduced metal may not form a film-like morphology upon reduction, or, if a film is formed, it may not be strong enough to withstand the necessary subsequent handling. Further, in some of these cases, the material of the powder into which the salt is printed cannot withstand the temperatures that would be required for subsequent sintering or melting of the metal from the salt. In these cases, it is advantageous to setter the printed part in another powder, for instance a ceramic powder that can withstand high temperatures, and to then treat the part to sinter or to melt to reduced metal.

Settering can be conducted at different stages along the process, depending upon the strength of the body at these various stages. For instance, as shown in FIG. 5B, in some cases, the body may be strong enough to remove from the original bed and setter 506B after the step 444 of drying the salt solution to crystals, before any reduction. The body can be settered 506B in a different powder material, followed by steps that are similar to those discussed above: provision 502B of a reducing atmosphere, which is optional; providing 504B temperature for a duration sufficient to reduce the salt in the necks to metal, and, if desired, to sinter or melt the reduced metal, as discussed above. The settering powder is removed 508 and densification proceeds as described above, if desired.

Although it has been mentioned above that settering introduces some difficulties into powder processes and is not always desirable, not all of the difficulties are present in this case. A principal difficulty with settering arises if it is used during sintering of the main body of powder. The main body of the part being formed tends to shrink (under influence of the sintering), while the settering material tends to resist the shrinkage. However, in the present case, although some sintering is technically taking place, sintering is not taking place throughout the powder particles that form the main body of the part, but only within the deposited metal regions. Thus, any shrinkage that does occur is minimal, and thus, the resistance to shrinkage by the settering material does not present the same degree of problems.

Suitable settering powders include ceramic powders, such as alumina, silicon carbide and zirconia powder and metallic powders such as molybdenum, tungsten or other refractory metals. Typically, fairly large powder sizes in the range of 30–200 microns would be used to provide for flowability of the settering powder and to minimize the possibility of any sintering of the settering powder.

With relatively small parts, having a maximum dimension of about 2 inches (5 cm) it is sometimes possible to remove the part from the powder of the original bed, and heat treat it without settering it in another powder. This is because such small parts tend not to slump to a degree that would require settering support. However, the sensitivity to slumping depends on many factors of the actual part, and can be easily determined.

Figure 5B:
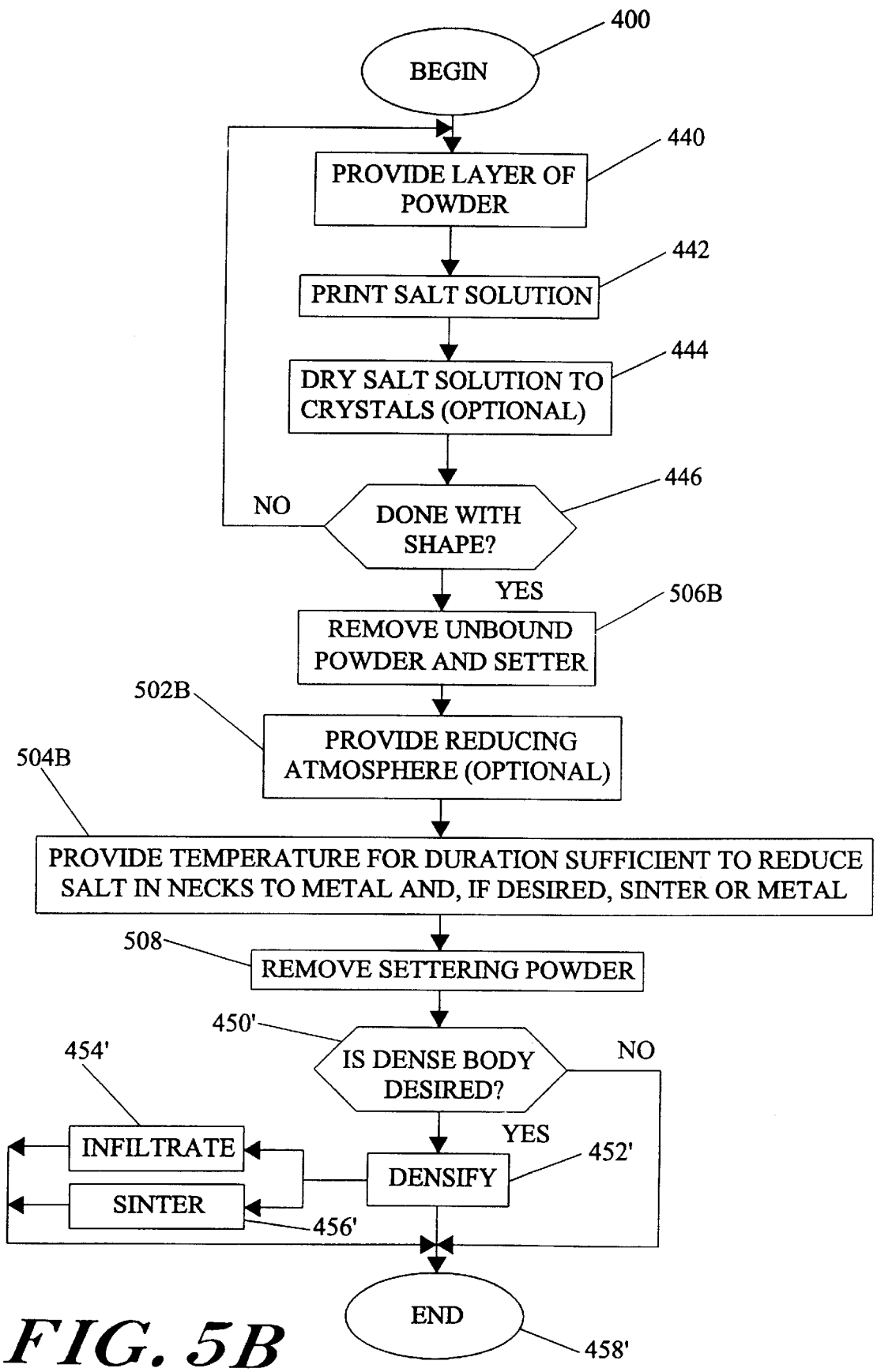
FIG. 5B is a schematic representation, in flow chart form, of another reduction embodiment of the method of the invention, where the body is removed from the original powder bed and settered after the salt has crystallized, and where all of the heating of the body is conducted in the settering bed.
Figure 5C:
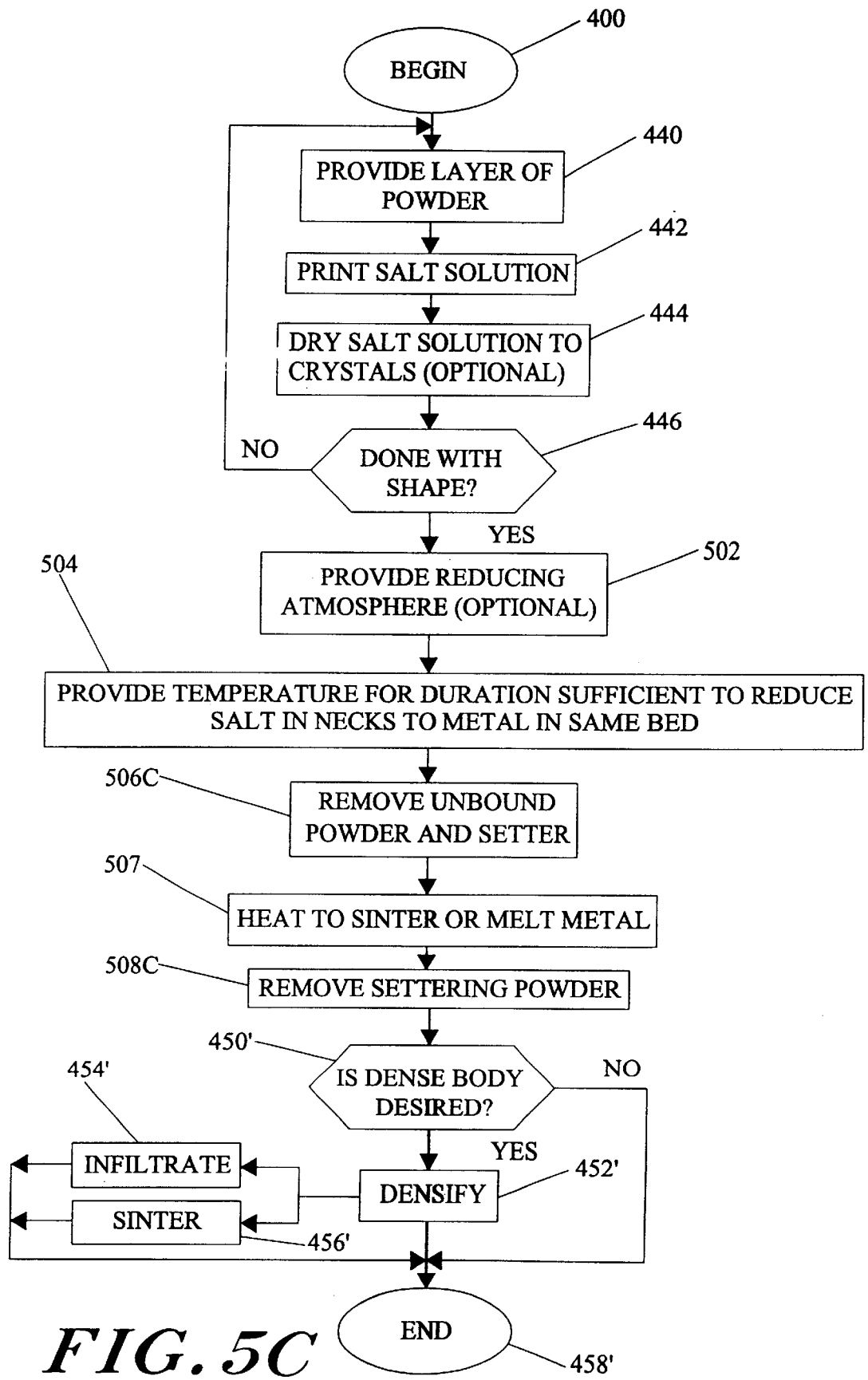
FIG. 5C is a schematic representation, in flow chart form, of yet another reduction embodiment of the method of the invention, where the body is removed from the original powder bed and settered after the salt has reduced, and where additional heating of the body to sinter or melt is conducted in the settering bed.

In other situations, as shown in FIG. 5C, it may be beneficial to reduce 504 the salt to metal in the original bed, thereby providing some strength to the body, then remove the unbound powder 506C and setter the body in another material, so that additional heat treatment may be conducted 507 to sinter or melt the reduced metal, thereby imparting additional strength as discussed above. The settering powder is removed 508C and the body is treated as discussed above. Again, with small parts, settering may not be necessary.

Figure 5D:
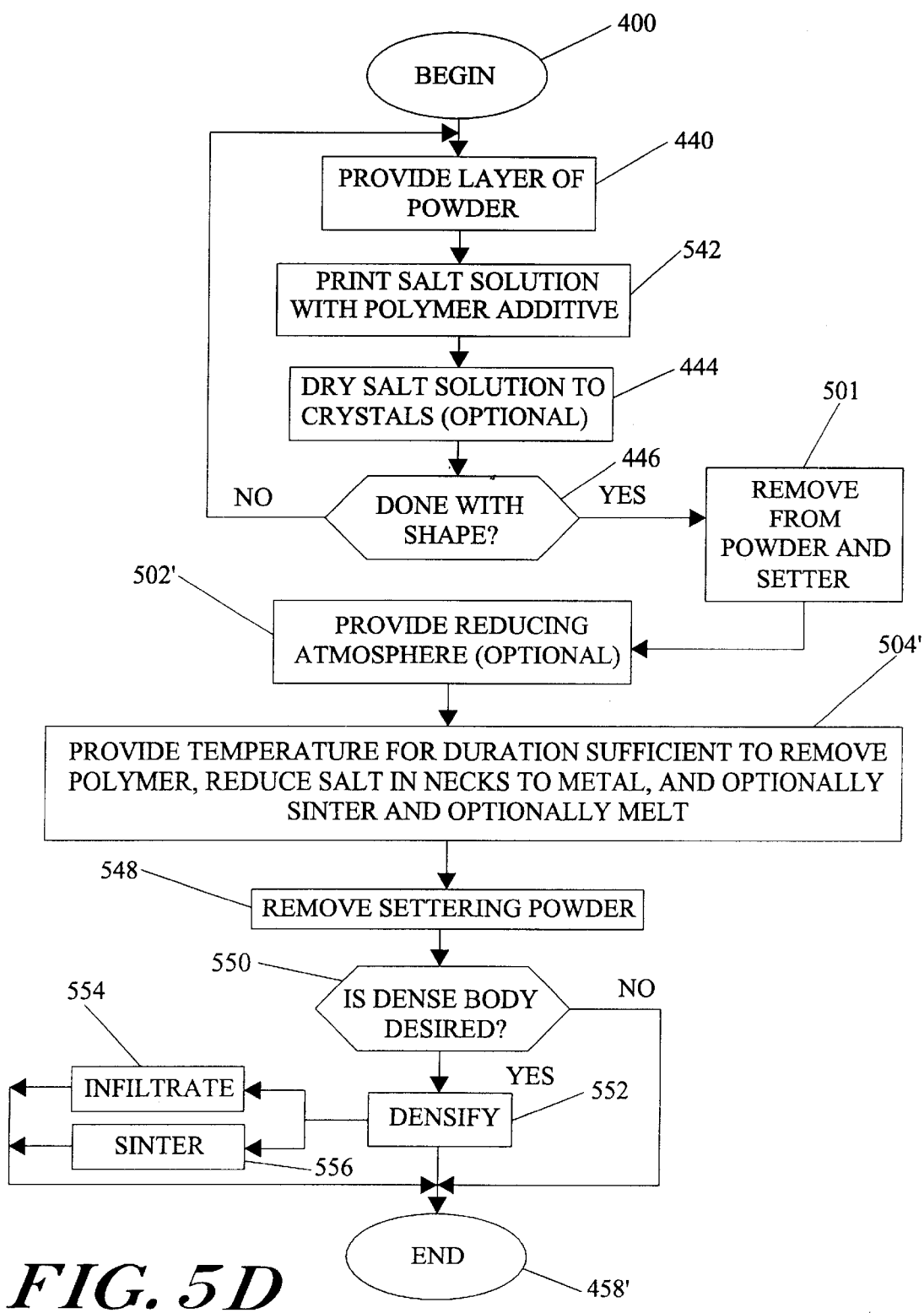
FIG. 5D is a schematic representation, in flow chart form, of another reduction embodiment of the method of the invention, where a fugitive binder is provided in addition to the salt binder and the body is removed from the original powder bed and settered.

Further, with respect to the reduction variant, in some cases as shown in FIG. 5D, neither the crystallized salt nor the reduced metal provide enough strength to enable removing the body from the original powder bed. When such a situation exists, it is helpful to provide 542 a polymeric binder in combination with the salt binder. The polymeric binder is effective at low temperatures to sufficiently bind the powder material, so that the bound body can be removed 501 from the original powder matrix in which it has been formed, and settered 501 in another material (or not settered, for suitably small articles). The polymeric binder material holds the part together. In this situation, all of the heating steps 504' can be conducted in the settered state, including reducing (either in a special atmosphere 502' or an inert atmosphere), sintering of the metal from the salt, and melting of the metal from the salt. After sintering (if the part is strong enough) or melting, the settering powder is removed 548 and subsequent treatment is applied as discussed above, for instance densification 552 by infiltration 554 or sintering 556.

It is also possible to create necks that are a combination of two different metals, for instance by providing two (or more) different salts in the salt solution. In choosing the different salts, it is important that the salts not combine into a species that will precipitate out of the solution. In general, if the anion of the salt is the same, such precipitation will not take place. For instance, silver nitrate and copper nitrate may both be provided in the same solution, and used to form a deposit that includes both metals, without any premature precipitation. If silver and copper salts were dried, and then reduced, and then heated to melt the resulting silver and copper metals, an alloy of copper and silver could be formed for increased strength.

Further, it is also possible to create necks that are a species of material that is anywhere along the transformation pathway from salt to metal. Some such species may provide adequate strength.

Examples of the variants illustrated in FIGS. 5A–5D follow.

(i) Silver Nitrate

Figure 7:
FIG. 7 is an electron micrograph of a cross-section of a silver nitrate bound product with a skeleton of steel powder, after residing in a forming gas, showing reduction of silver into thin films joining the powder granules.

An example of a suitable instance of the reduction embodiment as shown in FIG. 5A uses one molar solution of silver nitrate ($AgNO_3$) dissolved in water as the binder. A suitable powder is 60 micron diameter spherical 316 stainless steel powder. The silver nitrate solution is administered to the powderbed, allowed to infiltrate and then dried. The entire powderbed, including the region bearing the salt is then placed in a furnace under an atmosphere of forming gas consisting of 5% hydrogen and 95% argon. The furnace is ramped up at a rate of 5° C./min to a temperature of 450° C., held at 450° C. for an hour and then cooled at a rate of 5° C./min. The silver nitrate decomposes to silver metal and gaseous byproducts (nitrogen, oxygen, nitrogen oxides). The result, as shown in FIG. 7, is the formation of silver films that cover parts of the larger spherical particles and of strong silver necks between the particles. The volume of silver metal reduced will be approximately 0.69% of the volume of the steel powder. The part is removed from the powder. The shrinkage of the part from the condition in which the salt is dry to the condition in which the metal bound skeleton is formed is measured as 0 to within the experimental error of 0.1%.

The part may then be infiltrated if a fully dense part is desired. A suitable infiltrant is Epoxy PR-500, an aerospace epoxy from 3M. The infiltration is carried out in an oven at a temperature of 175° C.

Silver Nitrate can also serve as a binder according the pathway of FIG. 5A using Mo, W, tool steel P-20, and tool steel H-13 powders. Hydrogen is not necessary for this example as the silver nitrate will decompose to silver under inert gas, however, the use of forming gas may be preferred to avoid oxidation of the powder by the by-products of the decomposition.

(ii) Copper Nitrate

Another example of a suitable instance of the reduction embodiment as shown in FIG. 5A, where the powder bed is fired beyond the reduction temperature of the metal, uses a 1.75 molar solution of copper nitrate $(Cu(NO_3)_2.3H_2O)$ dissolved in water as the binder. A suitable powder is 60 micron diameter spherical molybdenum (Mo) powder. The copper nitrate solution is administered to the powderbed, allowed to infiltrate and then dried. The entire powderbed, including the region bearing the salt is then placed in a furnace under an atmosphere of forming gas consisting of 5% hydrogen and 95% argon. The furnace is ramped up at a rate of 5° C./min to a temperature of 1110° C., held at 1110° C. for half an hour and then cooled at a rate of 5° C./min. During this heat treatment, copper nitrate reduces to copper oxide (CuO) at about 180° C. and then copper oxide reduces to copper. Copper melts at 1083° C. The result, as shown in FIG. 12, is the formation of strong copper necks between the particles. The volume of copper metal reduced will be approximately 0.83% of the volume of the Mo powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

(iii) Nickel Nitrate

Another example of a suitable instance of the reduction embodiment as shown in FIG. 5A uses a 1.3 molar solution of nickel nitrate $(Ni(NO_3)_2.6H_2O)$ dissolved in water as the binder. A suitable powder is 22 micron tungsten carbide (WC) powder. The nickel nitrate solution is administered to the powderbed, allowed to infiltrate and then dried. The entire powderbed, including the region bearing the salt is then placed in a furnace under an atmosphere of forming gas consisting of 5% hydrogen and 95% argon. The furnace is ramped up at a rate of 5° C./min to a temperature of 1200° C., held at 1200° C. for half an hour and then cooled at a rate of 5° C./min. During this heat treatment, nickel nitrate reduces to nickel oxide (NiO) at about 600° C. which reduces to nickel. While the reduction of the nickel nitrate to the nickel oxide can be accomplished in a non-reducing atmosphere, the reduction of the oxide to nickel has to be done in a reducing atmosphere. The volume of nickel metal reduced will be approximately 0.57% of the volume of the WC powder. The part is removed from the powder and may then be infiltrated if a fully dense part is desired. A suitable infiltrant is Epoxy PR-500, an aerospace epoxy from 3M. The infiltration is carried out in an oven at a temperature of 175° C. Nickel Nitrate can also serve as a binder according the pathway of FIG. 5A using 40 micron spherical alumina powder. The heat treatment on this case is carried out at 1530° C.

(iv) Nickel (II) Acetate

Another example of a suitable instance of the reduction embodiment as shown in FIG. 5A uses a 0.3 molar solution of nickel acetate $(Ni(CH_3COO)_2.4H_2O)$ dissolved in water as the binder. A suitable powder is 22 micron tungsten carbide (WC) powder. The nickel acetate solution is administered to the powderbed, allowed to infiltrate and then dried. The entire powderbed, including the region bearing the salt is then placed in a furnace under an atmosphere of forming gas consisting of 5% hydrogen and 95% argon. The furnace is ramped up at a rate of 5° C./min to a temperature of 1200° C., held at 1200° C. for half an hour and then cooled at a rate of 5° C./min. The volume of nickel metal reduced will be approximately 0.13% of the volume of the WC powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

(v) Cobalt (II) Acetate

Another example of a suitable instance of the reduction embodiment as shown in FIG. 5A uses a 0.7 molar solution of nickel acetate $(Co(CH_3COO)_2.4H_2O)$ dissolved in water as the binder. A suitable powder is 22 micron tungsten carbide (WC) powder. The cobalt acetate solution is administered to the powderbed, allowed to infiltrate and then dried. The entire powderbed, including the region bearing the salt is then placed in a furnace under an atmosphere of forming gas consisting of 5% hydrogen and 95% argon. The furnace is ramped up at a rate of 5° C./min to a temperature of 1200° C., held at 1200° C. for half an hour and then cooled at a rate of 5° C./min. The volume of cobalt metal reduced will be approximately 0.27% of the volume of the WC powder. The part is removed from the powder and may then be infiltrated if a fully dense part is desired. A suitable infiltrant is Epoxy PR-500, an aerospace epoxy from 3M. The infiltration is carried out in an oven at a temperature of 175° C. Another suitable infiltrant is Copper metal. The infiltration is carried out at 1250° C. under a gas atmosphere.

An example of a suitable instance of the reduction embodiment that uses subsequent settering and reducing, and sintering or melting of the crystallized salt, as shown in FIG. 5B is as follows.

Nickel (II) Acetate

A 0.3 molar solution of nickel acetate $(Ni(CH_3COO)_2.4H_2O)$ is dissolved in water as the binder. A suitable powder is 22 micron tungsten carbide (WC) powder. The nickel acetate solution is administered to the powderbed, allowed to infiltrate and then dried. The printed part is removed from the powderbed before any reduction. It is settered in alumina powder and it is placed in a furnace under an atmosphere of forming gas consisting of 5% hydrogen and 95% argon. The furnace is ramped up at a rate of 5° C./min to a temperature of 1200° C., held at 1200° C. for half an hour and then cooled at a rate of 5° C./min. The volume of nickel metal reduced will be approximately 0.13% of the volume of the WC powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

An example of a process shown in FIG. 5C, that uses subsequent settering and sintering or melting of the reduced metal is as follows.

Nickel Nitrate on Mo

An example of a suitable instance of the reduction embodiment as shown in FIG. 5C uses a 1.3 molar solution of nickel nitrate ($Ni(NO_3)_2 \cdot 6H_2O$) dissolved in water as the binder. A suitable powder is 60 micron spherical Mo powder. The nickel nitrate solution is administered to the powderbed, allowed to infiltrate and then dried. The entire powderbed, including the region bearing the salt is then placed in a furnace under an atmosphere of forming gas consisting of 5% hydrogen and 95% argon. The furnace is ramped up at a rate of 5° C./min to a temperature of 975° C., held at 975° C. for half an hour and then cooled at a rate of 5° C./min. During this heat treatment, nickel nitrate looses water, reduces to nickel oxide (NiO) (at around 600°) and finally reduces to nickel. After this firing, the printed part is strong enough to be removed from the powderbed. If more strength is desirable, a second heat treatment might follow: the printed part is settered in alumina powder and placed in the furnace and fired under forming gas at 1200° C. Again, the heating and cooling rate is 5° C./min. The volume of nickel metal reduced will be approximately 0.57% of the volume of the Mo powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

An example of a process shown in FIG. 5D, that uses a salt and polymeric binder, followed by settering and heat treatment is as follows.

A copper nitrate-Polyacrylic acid (PAA) solution is prepared in the following proportions: 93 v.o. % of 1.75 molar water solution of copper nitrate ($Cu(NO_3)_2 \cdot 3H_2O$) and 7 v.o. % of PAA solution. The latter solution consists of 35 wt % $H_2O$ and of 65 wt % PAA. The average molecular weight of the used PAA is approximately 2000. A suitable powder is 60 micron diameter spherical molybdenum (Mo) powder. This copper nitrate-PAA solution is administered to the powderbed, allowed to infiltrate and then dried. The printed part is then removed from the powderbed (PAA provides the necessary strength), and it is settered in alumina powder. It is then placed in a furnace under an atmosphere of forming gas consisting of 5% hydrogen and 95% argon. The furnace is ramped up at a rate of 5° C./min to a temperature of 500° C. It is held at 500° C. in order to burn out the PAA; it is then ramped up at a rate of 5°/min to a temperature of 1110° C., held at 1110° C. for half an hour and then cooled at a rate of 5° C./min. During this heat treatment, copper nitrate reduces to copper oxide (CuO) which reduces to copper. Copper melts at 1083° C. and binds the Mo powder. The volume of copper metal reduced will be approximately 0.77% of the volume of the Mo powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

PAA can be added to any of the solutions discussed above in connection with the discussion of FIG. 5A (all firing steps conducted in the original powder bed). The same concentration of PAA (as in the case of copper nitrate), produces parts with high green strength.

Displacement Reaction

Figure 8A:
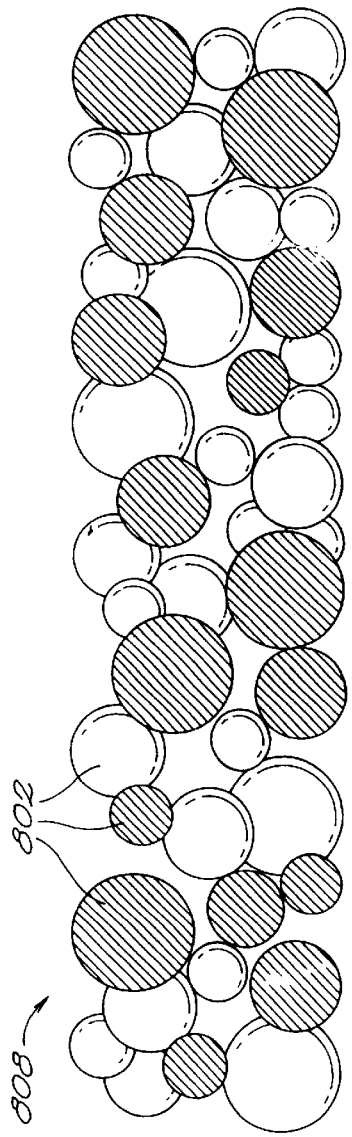
Figure 8B:
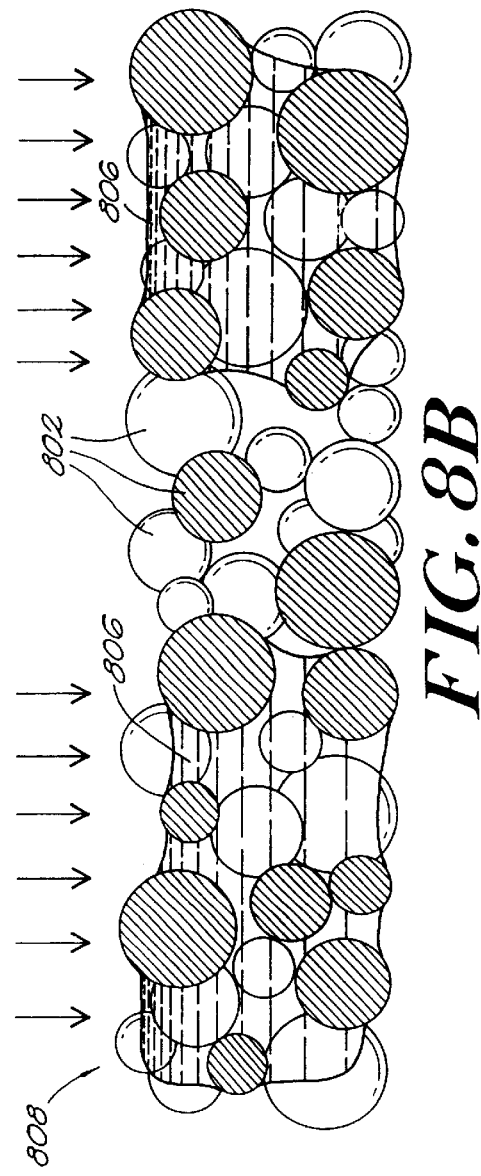
Figure 8C:
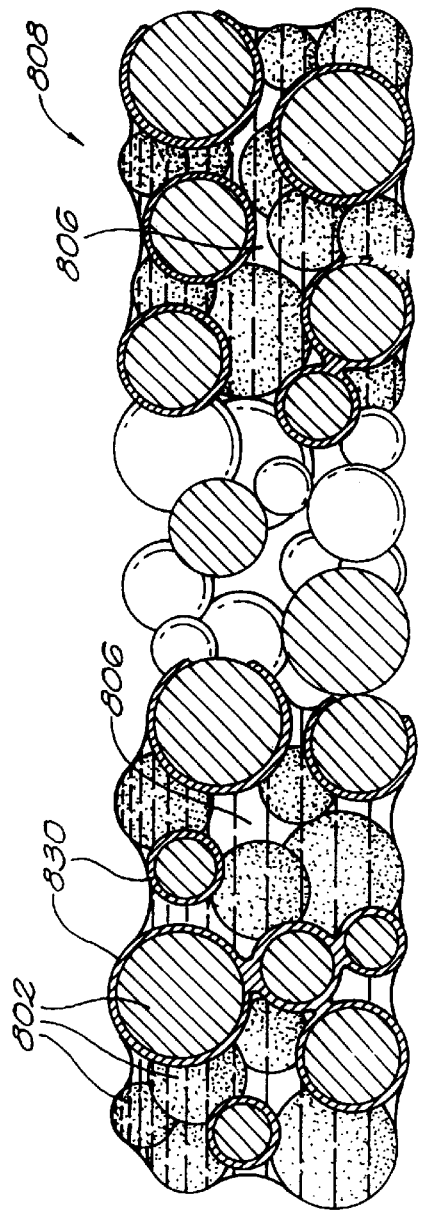

A third major embodiment of the method of the invention is to use a salt containing solution that undergoes a displacement reaction with a metal powder. The idea of displacement reaction binding is shown in FIGS. 8A, 8B, 8C, 8D, 8E, 8F, 8G, 8H and 8I. A salt solution is printed into a layer 808 of powder particles 802 of a metal that is capable of undergoing an electrochemical displacement reaction with the metal of the salt. In other words, the metal of the powder provides electrons to the metal of the salt, as the metal of the powder dissolves into the salt solution. The solution 806 collects between the particles due to capillary action. A thin metal film 830 (metal from the salt) deposits substantially all over the powder particles 802 in the printed regions directly from the solution (FIG. 8C). The depositing begins almost immediately upon contact of the solution with the powder. This leads to small bridges between the single powder particles 802, within a layer 808, which bridges eventually result in the particles sticking together.

Figure 8D:
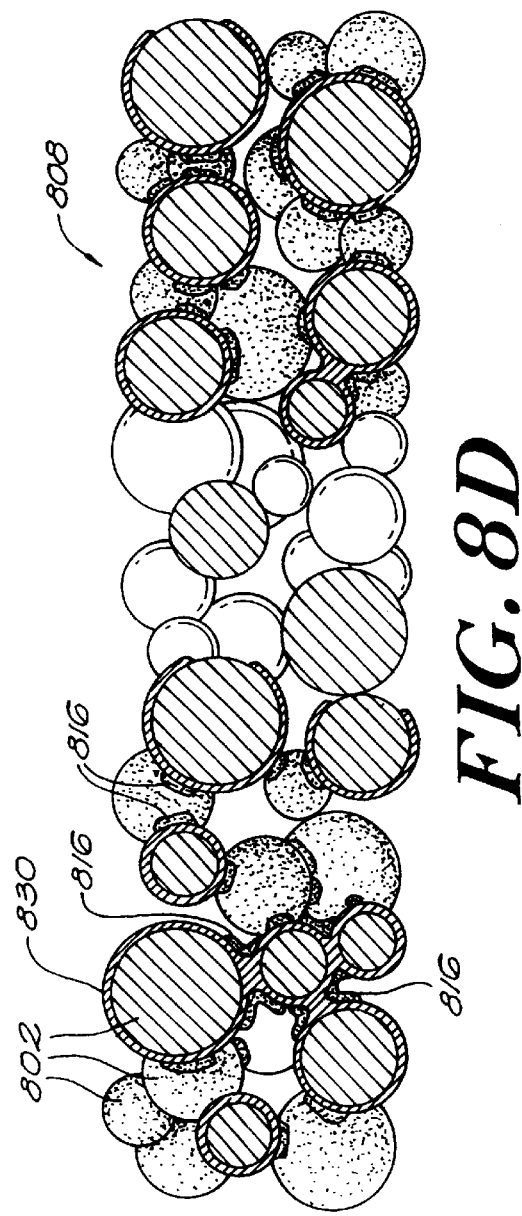
Figure 8E:
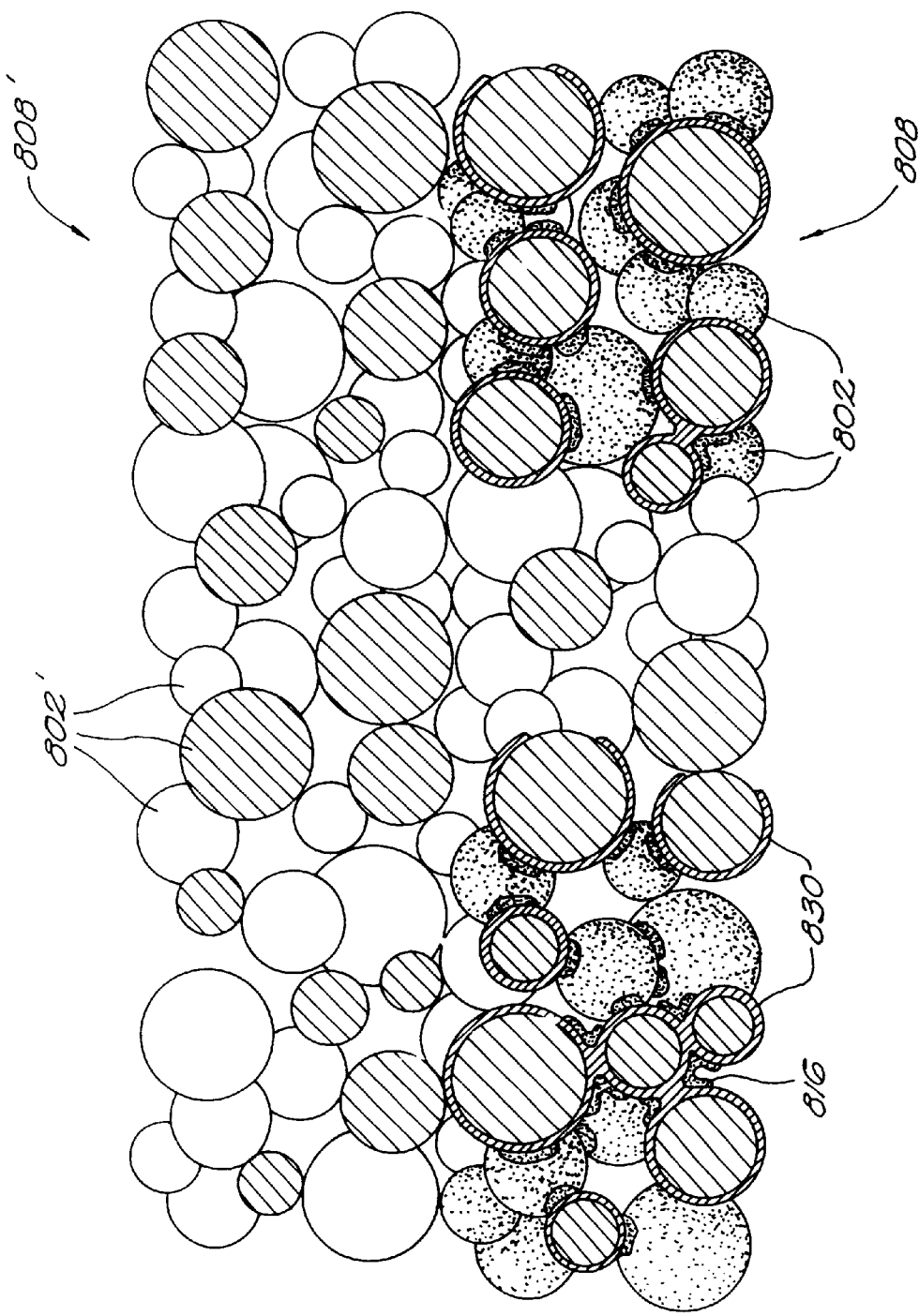

The printed layer can be dried, as shown in FIG. 8D, where the solution recedes to the necks, as in the embodiments discussed above and deposits 816 form. Alternatively, this drying step can be conducted after several layers have been spread and printed upon.

Figure 8F:
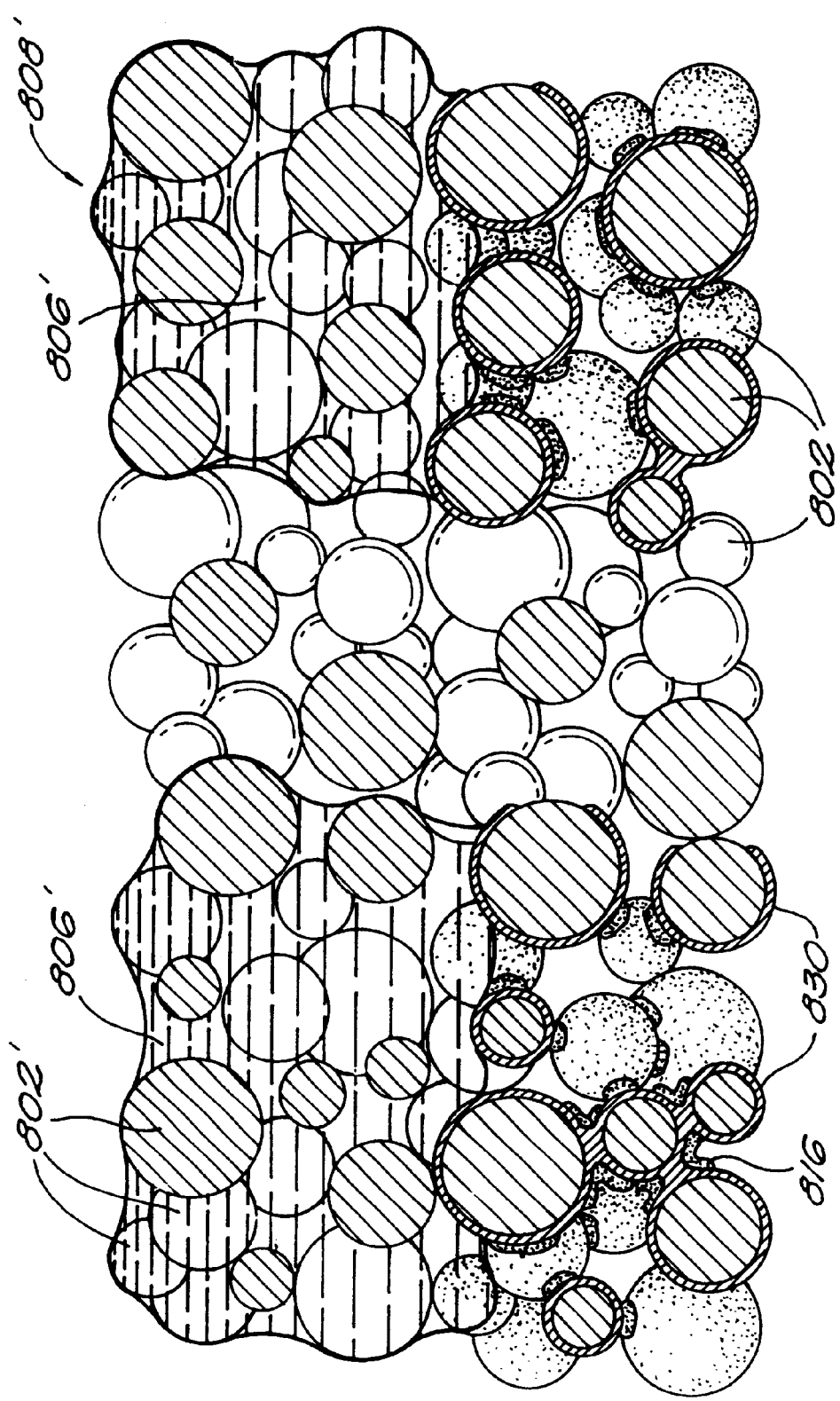
Figure 8G:
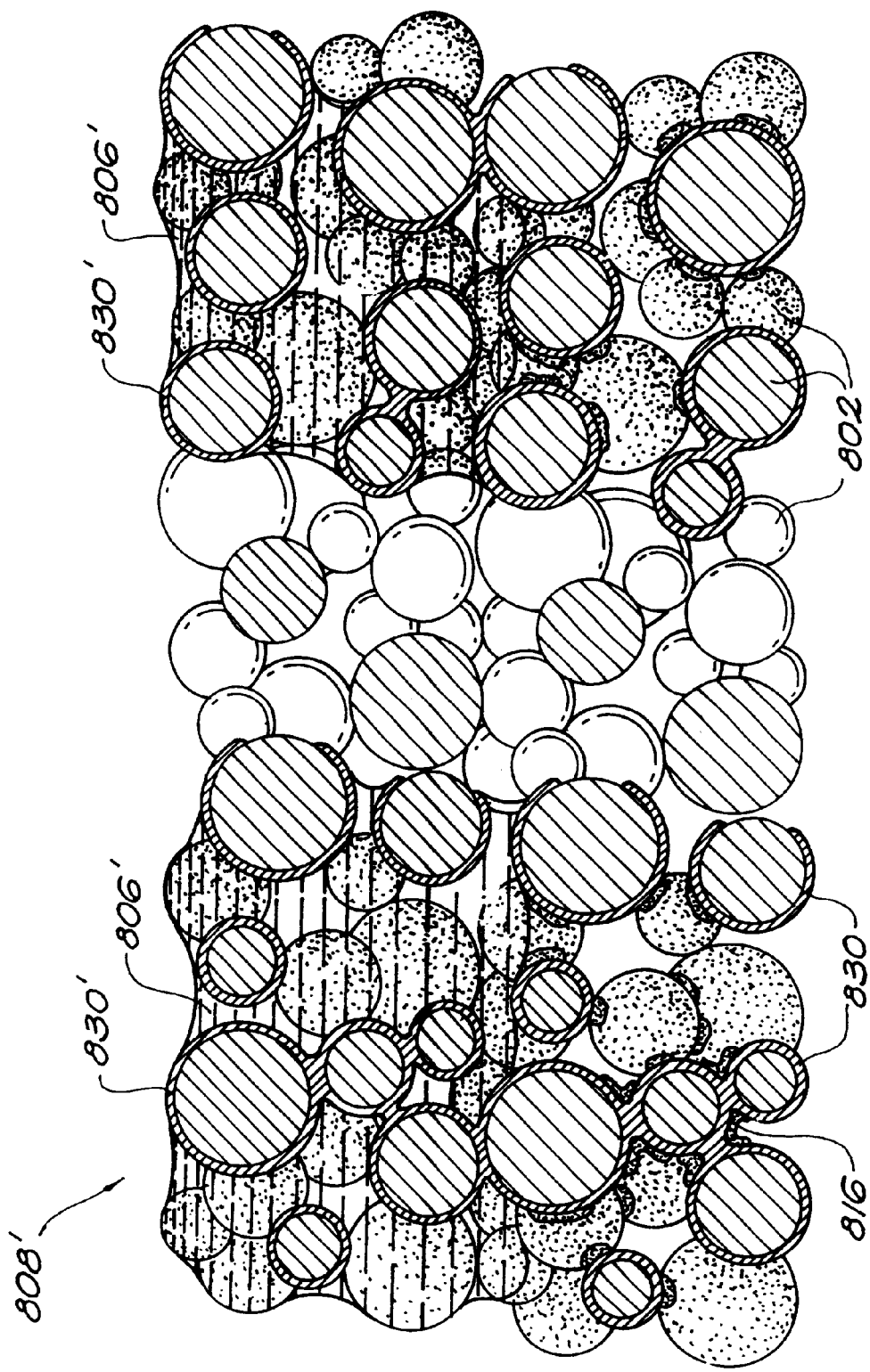
Figure 8H:
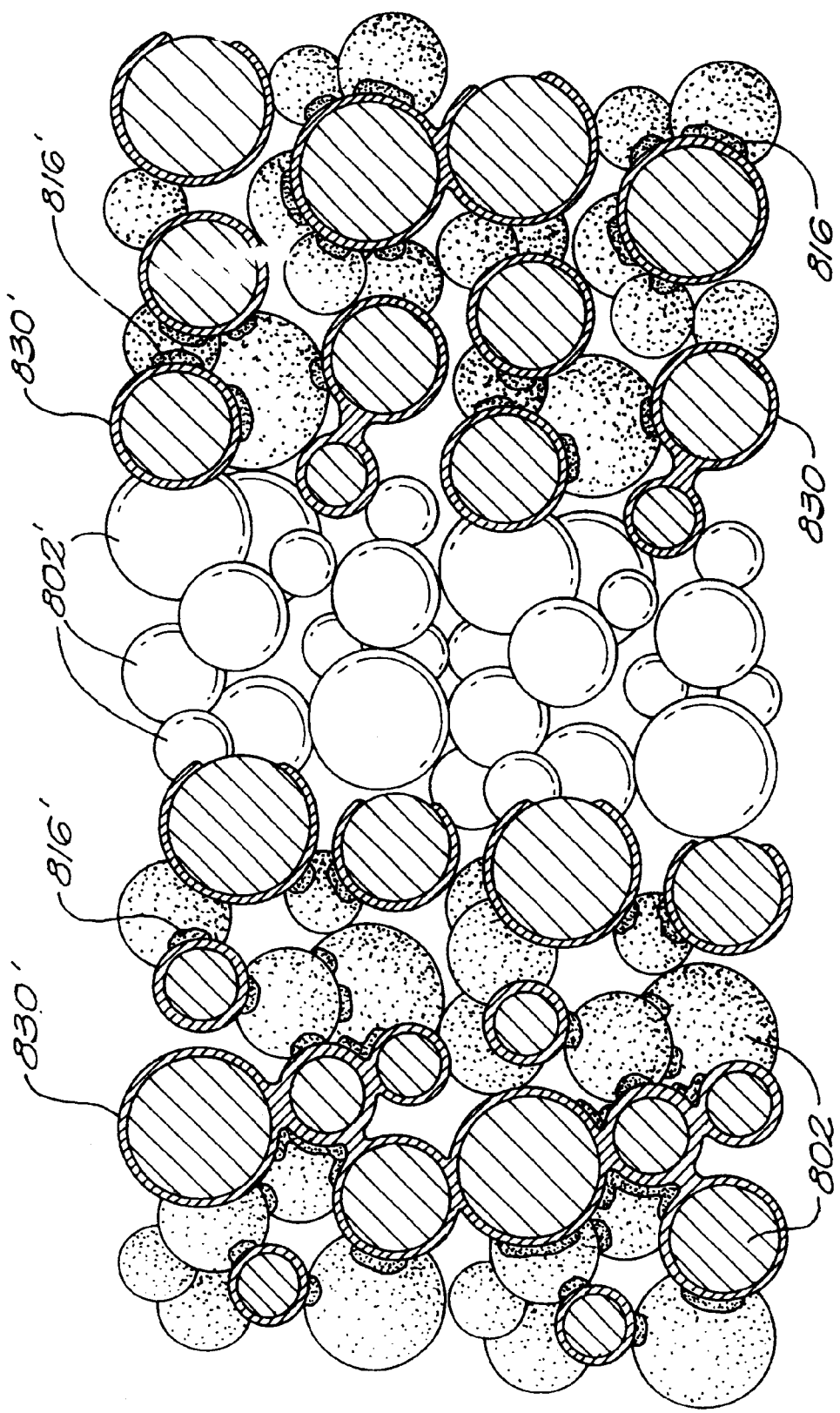
Figure 81:
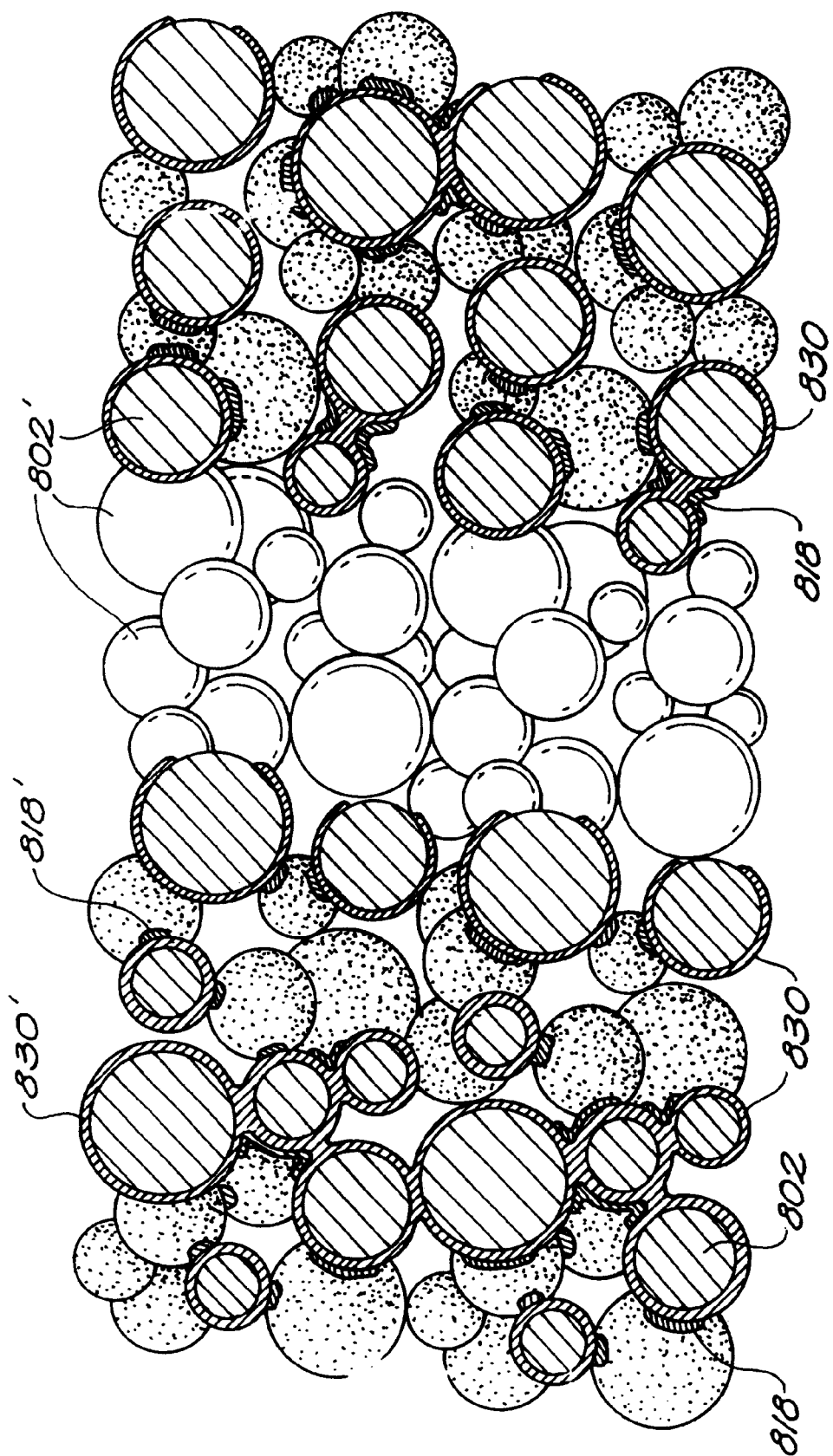

Additional layers 8081 are added (FIG. 8E) and printed with salt solution 806' (FIG. 8F). Metal again deposits directly from solution as thin films 830' around the particles 802' (FIG. 8G). The particles 802' of the additional layer 808' are joined to each other and to the particles 802 of the previously applied layer 808. It is possible to apply further heat treatment to the body (FIG. 8I), which may cause the further reduction of additional metal 818 from the remaining dried salt 816, thereby adding to the necks.

Possible candidates for this binder type are solutions and powder combinations where the salt and a portion of the metal powder undergo an electrochemical displacement reaction. As a result of this reaction the metal of the salt (or a portion of it) is deposited on the metal powder.

This deposition of the metal from ionic solutions consists essentially of adding electrons to the dissolved metal ions (of the salt). These electrons are provided by the metal powder as it partially dissolves into the solution.

In a displacement reaction, part of the metal of the powder dissolves into the solution. When the solution dries, this part of the metal which is now in ionic form crystallizes in some salt form. After heat treatment, it may reduce to metal. Thus, the bridges formed by this method may consist of metal structures of both the metal of the powder and the metal of the salt in the added salt solution. These structures may include alloys, mixtures, coatings of sequential layers of first one then the other, islands of one in a matrix of the other, or fine particles that are interspersed.

The upper limit of the amount of the powder reduced can be inferred from the related chemical reaction. For instance, when copper reacts with silver nitrate

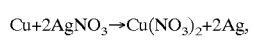

for every two silver cations, $Ag^+$, that reduce to silver metal, one copper atom oxidizes to $Cu^{2+}$. The number of copper atoms dissolved, usually, will be less than the theoretical maximum (one half of the number of $Ag^+$ that were present in the initial solution) because not the entire amount of $AgNO_3$ will be reduced to Ag.

A guideline that may be useful in some circumstances is to compare the relative positions on the electromotive force series of the metal of the powder with the metal of the salt. Generally if the metal of the salt is more noble than that of the powder, then a displacement reaction is more likely to occur. As an example, consider the displacement of copper by iron in the detailed example set forth below. Other chemical species present in the solution may make it possible to have a displacement reaction even when the metal of the salt is less noble than the metal of the powder. Such other species include ammonium ions or cyanide ions.

Figure 9A:
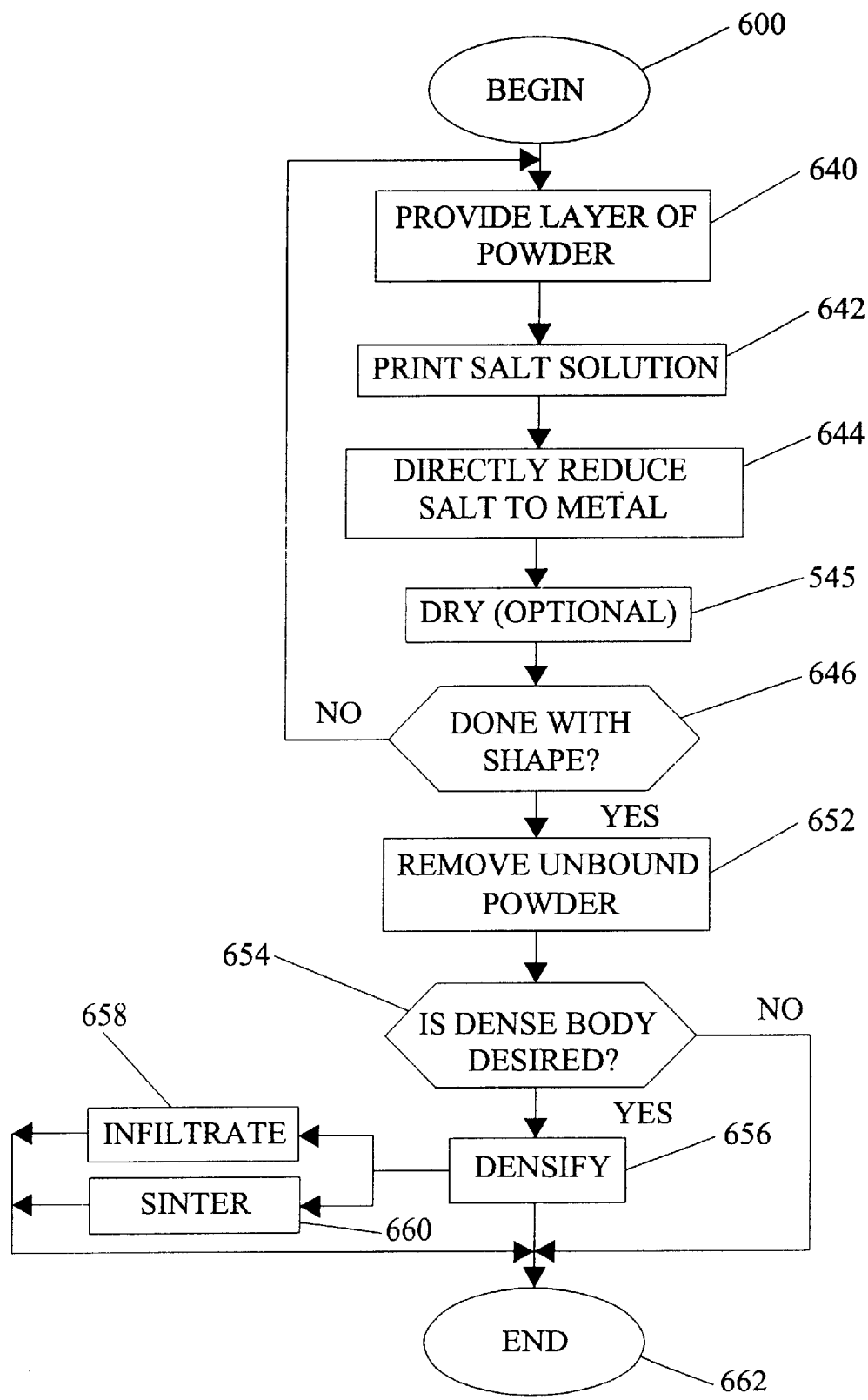
FIG. 9A is a schematic representation, in flow chart form, of an electrochemical displacement reaction embodiment of the method of the invention.

The steps of several variants of this embodiment of the invention are also outlined in flow chart form in FIGS. 9A, 9B, 9C and 9D. FIG. 9A shows an embodiment where all of the activity is conducted in the original powder bed. The process begins 600, followed by providing 640 a layer of powder. The salt solution is printed 642, and directly reduces 644 to metal upon contact. If more shape buildup is required 646, the process returns to the powder laying step 640. If not, the unbound powder is removed 652, and the body is densified, if desired, as discussed above.

As with the reduction embodiment discussed above, the straight displacement reaction method does not always provide as high a strength or other properties as may be desired. If so, then according to a variant of the method shown in FIG. 9B, the part is heated 650 in the original powder bed to sinter or melt the deposited metal, analogous to the similar step discussed above in connection with the reduction embodiment of the invention in FIG. 5A. In addition to sintering and melting, if any unreduced salt remains in the body before heat treatment, metal may also reduce from that salt during the heat treatment 650. Such unreduced salt may be either or both the salt from the added solution or the salt from the metal powder, formed as described above.

Figure 9B:
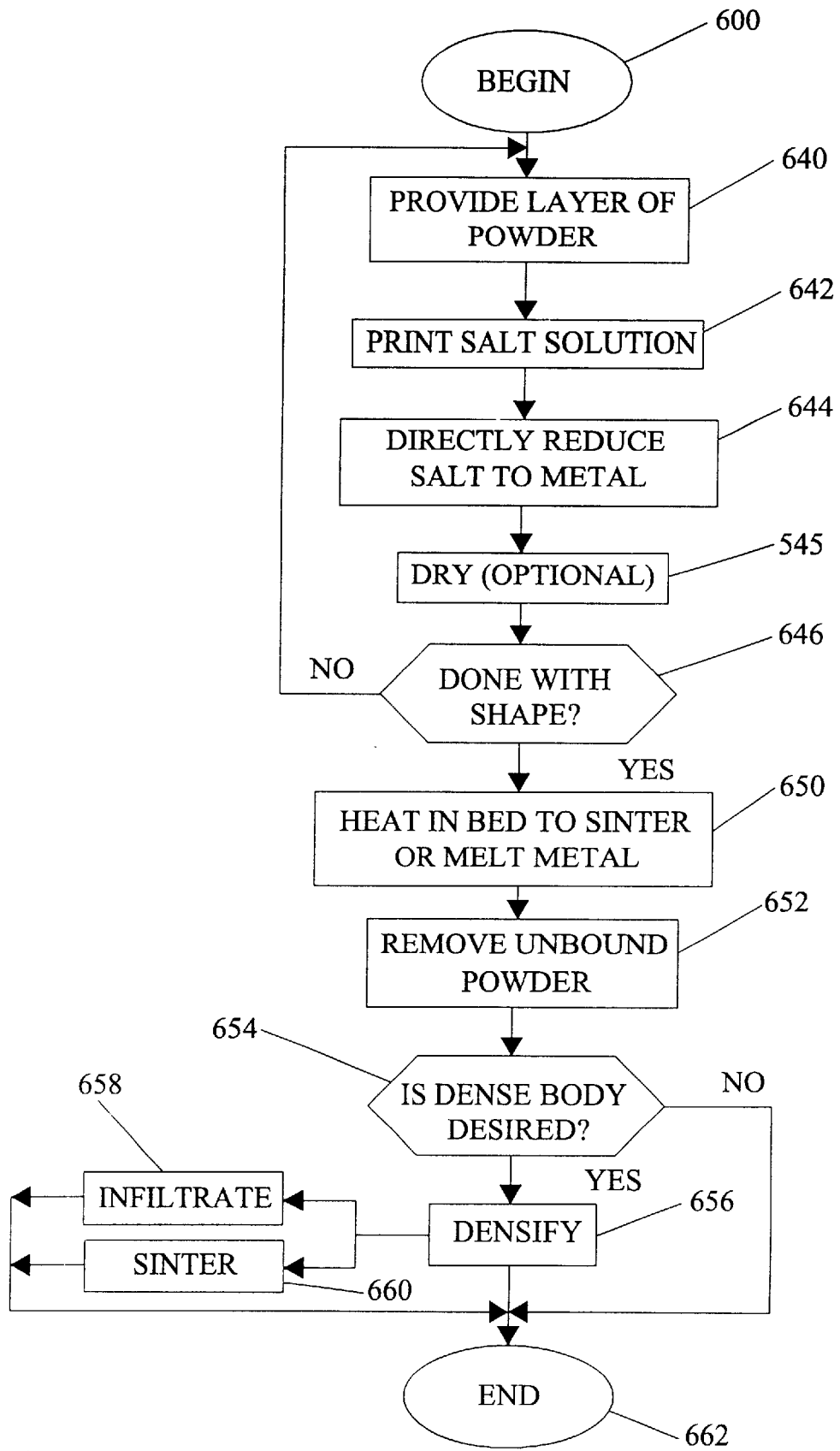
FIG. 9B is a schematic representation, in flow chart form, of another electrochemical displacement reaction embodiment of the method of the invention, where the body is further heat treated in the original powder bed to sinter or melt the reduced metal.
Figure 15:
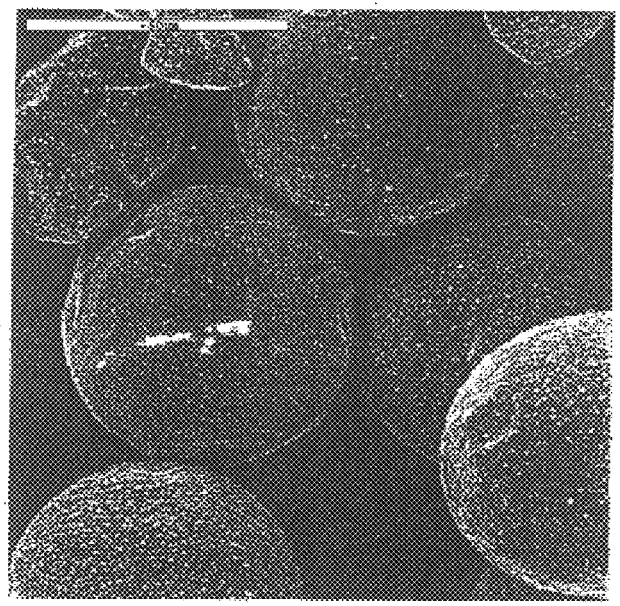
FIG. 15 is an electron micrograph of a cross-section of a silver bound product with a skeleton of molybdenum powder, after a displacement reaction with silver carbonate salt solution, where the product has been dried but not fired.
Figure 16:
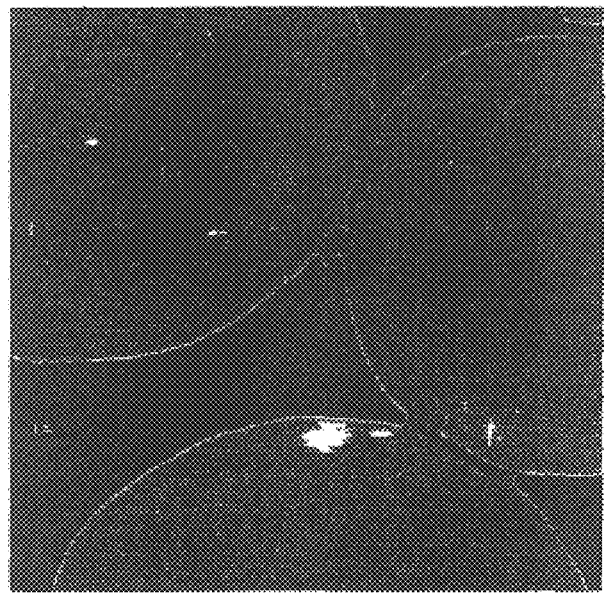
FIG. 16 is an electron micrograph of a cross-section of a silver bound product with a skeleton of molybdenum powder, after a displacement reaction such as shown in FIG. 15, where the product has been dried and fired at 980° C.

In some cases, the product of the displacement reaction as shown in FIG. 9A may be smooth, well defined necks, of the reduced metal (as observed in a scanning electron micrograph, such as FIG. 15, showing silver from silver carbonate deposited on molybdenum powder). However, in some cases these necks may have little strength as deposited, the film may be porous and weak or there may be a weak interface between the film and the powder (as can be seen by small cracks in the necks). In these latter cases, as shown in FIG. 9B, elevated temperature heat treatment steps 650 may be used to strengthen the necks, either by sintering or melting the metal of those necks. The result of such steps are shown in FIG. 16, which shows the silver coated molybdenum powder shown in FIG. 15, after firing at 980° C. Subsequent steps of this variant are the same as that shown in FIG. 9A, removal 652 of the powder and densification 656 if desired 654.

The foregoing discussion has assumed that any heating 650 of the powder article, either for causing sintering or melting of the metal arising from the displacement reaction with the salt, would be conducted in the original powder bed into which the salt solution had been printed. While such a practice is a very advantageous embodiment of the method of the invention, it is not always the most advantageous embodiment. In some cases, as in the reduction embodiments discussed above and illustrated in part by FIGS. 5B, 5C and 5D, the reduced metal may not form a film-like morphology upon reduction, or, if a film is formed, it is not strong enough to withstand the necessary subsequent handling. Further, in some of these cases, the material of the powder into which the salt is printed cannot withstand the temperatures that would be required for subsequent sintering or melting of the metal from the salt. In these cases, as in the reduction embodiment, it is advantageous to setter the printed part in another powder, for instance a ceramic powder that can withstand high temperatures, and to then treat the part to sinter or to melt the reduced metal.

As in the reduction method discussed above, if the part is relatively small (less than two inches (5 cm) in maximum dimension) it may not need to be settered.

Figure 9C:
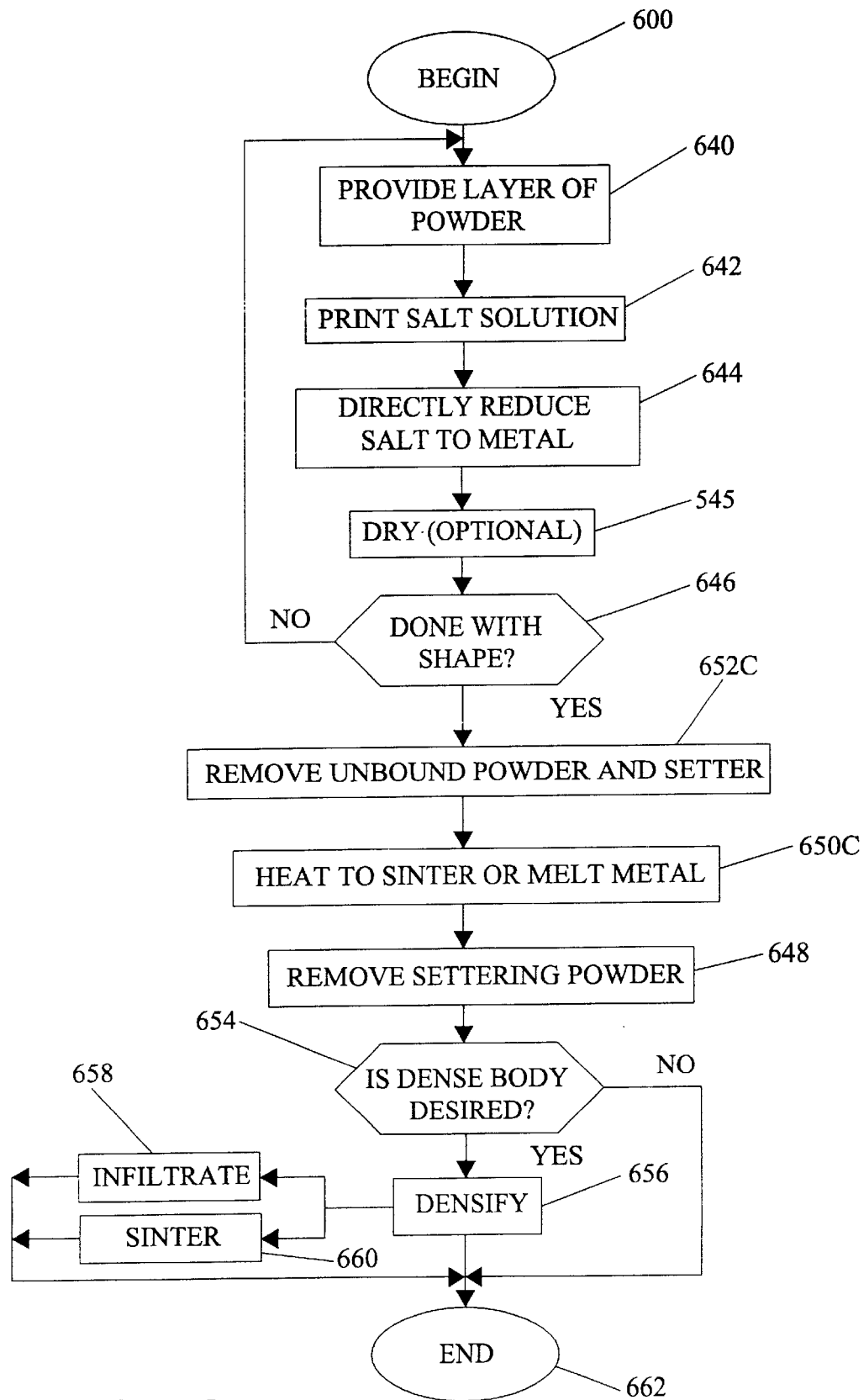
FIG. 9C is a schematic representation, in flow chart form, of still another electrochemical displacement reaction embodiment of the method of the invention, where the body is removed from the original powder bed and settered in another powder, and then further heat treated in the settering bed to sinter or melt the reduced metal.
Figure 13:
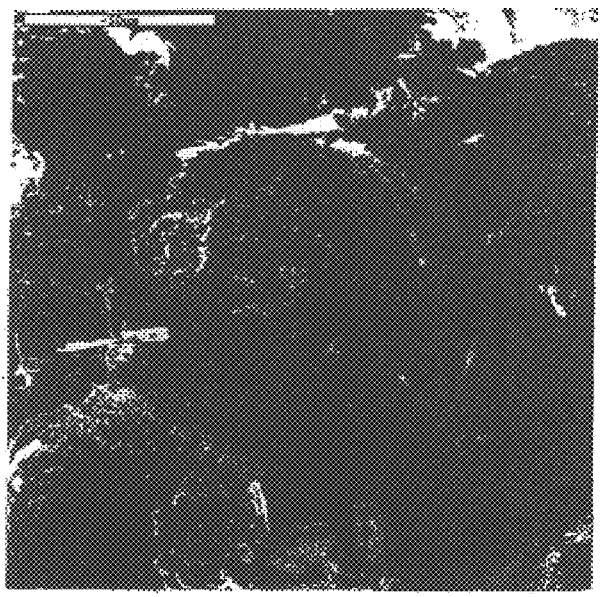
FIG. 13 is an electron micrograph of a cross-section of a skeleton of tool steel powder into which a salt of copper sulfate has been printed and undergone a displacement reaction, where the product has been dried, but not fired.
Figure 14:
FIG. 14 is an electron micrograph of a cross-section of a copper bound product with a skeleton of tool steel powder, the copper derived from copper sulfate solution as shown in FIG. 13, where the product has been dried, removed from the original powder bed, settered and fired at 1110° C.

One method of dealing with this situation is shown in FIG. 9C. If the reduced metal provides enough strength to permit handling the body, after the salt is reduced 644 to metal and optionally dried, the body is removed 652C from the original powder bed and settered in another, higher melting temperature powder bed. FIG. 13 is an electron micrograph which shows copper reduced onto tool steel from a copper sulfate solution, which provides enough strength to remove and setter the part. Crystallized, unreduced salt may also contribute to the strength of the body, as discussed above in connection with the crystallization embodiment shown in FIG. 3. FIG. 14 shows a copper bound steel part, as shown in FIG. 13, after settering and firing at 1110° C. to melt the copper metal. The settering powder is removed 648, and the body is densified, if desired.

Figure 9D:
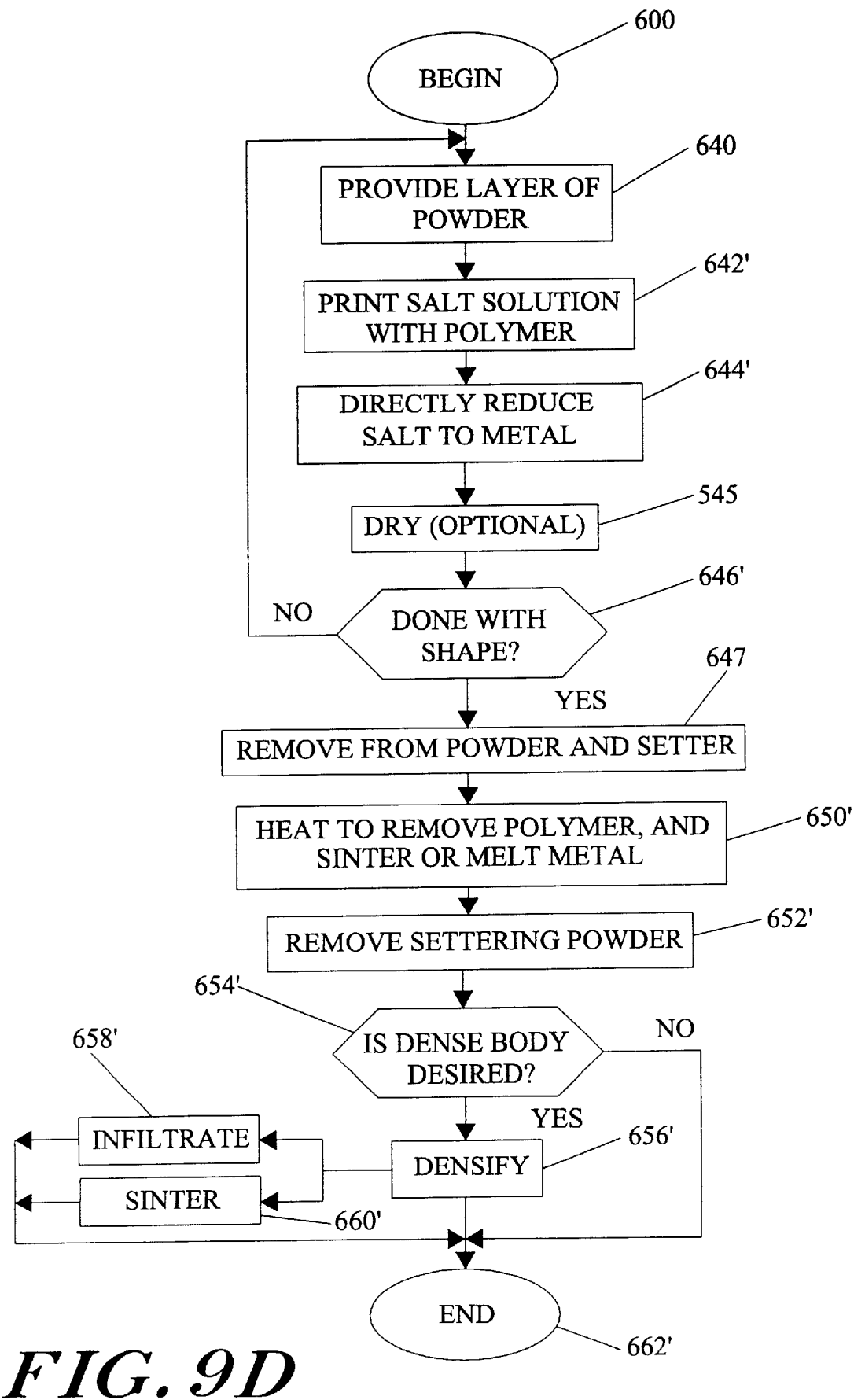
FIG. 9D is a schematic representation, in flow chart form, of yet another electrochemical displacement reaction embodiment of the method of the invention, where a fugitive binder is provided in addition to the salt binder, and the body is removed from the original powder bed and settered for further heat treatment.

In other cases, the reduced metal does not provide enough strength to permit removing the body from the original powder. In such cases, as shown in FIG. 9D, a polymer can be added to the salt solution that is to be printed, and the two can be printed together 642'. The metal reduces directly from the salt solution to the powder. As discussed above with respect to the reduction embodiment described in FIG. 5D, the polymer acts as a binder, enabling the part to be removed 647 and settered in another, higher temperature powder. The body is then heated 650' to remove the polymer binder, and sinter or melt the reduced metal, as described in connection with the above embodiments. The settering powder is removed 652', and the body is infiltrated, or not, as desired.

As is the case with the reduction embodiment, not all of the difficulties associated with settering and sintering are present in this case. Any shrinkage that occurs due to any sintering is minimal, and thus the resistance to shrinkage by the settering material does not present the same degree of problems.

A further advantage of the displacement reaction method of the invention is that the reduction of the metal takes place in solution, without the need for a reducing gas, such as hydrogen, discussed above.

Many examples of the foregoing types of displacement reactions can be given.

(i) $Ag_2CO_3$ on Mo

An example of a suitable instance of the displacement embodiment as shown in FIG. 9B, where after reduction, the body is fired, uses a 0.3 molar solution of silver carbonate ($Ag_2CO_3$). The solvent consists of the following: 87 v.o. % $H_2O$ and 13 v.o. % ammonium hydroxide (ACS, 29.6% NH3). A suitable powder is 60 micron diameter spherical molybdenum (Mo) powder. The silver carbonate solution is administered to the powderbed. Silver is deposited on the powder by means of displacement reaction as shown in FIG. 15. (Molybdenum transfers electrons to the metallic ions of the salt, converting them to metal (silver).) To avoid oxidation, the entire powderbed is then placed in a furnace under an atmosphere of forming gas consisting of 5% hydrogen and 95% argon. The furnace is ramped up at a rate of 5° C./min to a temperature of 980° C., held at 980° C. for half an hour and then cooled at a rate of 5° C./min. The result is the formation of silver films that cover parts of the large particles. Some of these films bind the Mo particles as seen in FIG. 16. The volume of silver metal will be approximately 0.41% of the volume of the Mo powder. The part is removed from the powder. The shrinkage of the part from the condition in which the salt is dry to the condition in which the metal bound skeleton is formed is measured as 0 to within the experimental error of 0.1%.

The part may then be infiltrated if a fully dense part is desired. A suitable infiltrant is Epoxy PR-500, an aerospace epoxy from 3M. The infiltration is carried out in an oven at a temperature of 175° C.

(ii) $CuSO_4$ on Tool Steel

An example of a suitable instance of the displacement embodiment as shown in FIG. 9C, where the part is removed from the original powder bed and settered and fired uses a 0.6 molar solution of copper sulfate ($CuSO_4$) dissolved in water as the binder. A suitable powder is 60 micron diameter spherical tool steel P-20 powder. The copper sulfate solution is administered to the powderbed. Copper is deposited on the powder by means of displacement reaction. The printed part has enough strength to be removed from the powderbed. The printed part is then settered in alumina powder and placed in a furnace under an atmosphere of forming gas consisting of 5% hydrogen and 95% argon. The furnace is ramped up at a rate of 5° C./min to a temperature of 1110° C., held at 1110° C. for half an hour and then cooled at a rate of 5° C./min. The volume of copper metal reduced will be approximately 0.28% of the volume of the steel powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

An example of a suitable instance of the embodiment as shown in FIG. 9D, where a polymer is added to the salt solution binder to aid in settering, uses a solution that consists of 93 v.o. % of a 0.3 molar silver carbonate solution (identical to the solution described in the example with silver carbonate on molybdenum, in connection with FIG. 9B above) and of 7 v.o % of a PAA solution which consists of 35 wt % $H_2O$ and of 65 wt % PAA. The average molecular weight of the used PAA is approximately 2000. A suitable powder is 60 micron diameter spherical molybdenum (Mo) powder. The solution is administered to the powderbed. Silver is deposited on the powder by means of displacement reaction. The PAA binds the silver-coated Mo powder. The printed part is removed from the Mo powder. It is then settered in alumina powder and then it is placed in a furnace under an atmosphere of forming gas consisting of 5% hydrogen and 95% argon. The furnace is ramped up at a rate of 5° C./min to a temperature of 500° C. It is held at 500° C. in order to burn out the PAA; it is then ramped up at a rate of 5°/min to a temperature of 980° C., held at 980° C. for half an hour and then cooled at a rate of 5° C./min. The volume of silver metal reduced will be approximately 0.38% of the volume of the Mo powder. The part is removed from the powder and may then be infiltrated if a fully dense part is desired. A suitable infiltrant is Epoxy PR-500, an aerospace epoxy from 3M. The infiltration is carried out in an oven at a temperature of 175° C.

General Processing Considerations

To determine how much salt to use in solution, for a given salt, the designer should determine the solubility limit, and then use different concentrations below the limit to determine a high enough concentration to provide the desired strength. A balance is then struck between having enough salt to provide the desired strength but not so much to as to cause precipitation of the salt.

When a salt solution is printed into the powder bed, it arrives at an equilibrium configuration, where the salt solution may not completely fill the voids in the powder bed. That is, immediately upon printing it may completely or nearly completely fill the voids, but capillarity then draws some of the liquid off into surrounding powder until an equilibrium configuration is reached. In spherical powder, this equilibrium configuration may typically result in about 60% of the void volume being filled by liquid. At this stage, the liquid in the voids is connected. As it dries, it becomes disconnected. At a stage near the end of drying, there is just a small bit of liquid at each particle neck and as the particle necks are not connected, neither will the liquid be. As the liquid evaporates, the remaining liquid tends to collect at the necks between the particles. This action tends to draw the salt into the necks which is exactly where it is desired.

If the salt solution is printed at full saturation, as the drying takes place, some salt will immediately precipitate that will not have had a chance to migrate to the necks. However, as it takes a while for salt to come out of the supersaturated solution, most of the salt will likely be drawn to the necks, as desired.

It is likely that as the drying takes place, small islands of the liquid will stick to the surface of powder particles, rather than being fully drawn to the necks, and that this would also result in some salt being recrystallized at the surface of a spherical powder particle, but not at the necks. This salt may not contribute to binding. However, it may contribute to binding if, during the heat treating it is melted in the salt state or in the metal state.

Metal salt solutions can be used as binders for various 3D Printing system configurations. The binder can be printed using a drop-on-demand ("DOD") printer. With this device, a drop of printing fluid is not produced at the nozzle, unless it is desired to print the drop on the target. The drop is typically produced using a piezo-electric crystal, as is well known. An example of a suitable piezo type ink-jet printhead is a nine-nozzle system "ink-jet printing mechanism, model PT 88S" provided by Siemens, Inc.

It is also possible to vector print through a simple nozzle that opens before the vector motion begins, and closes at the end of the vector path. Alternately, a fast acting solenoid valve that places drops where needed can be used.

Some metal salts are highly corrosive of components that are normally found in printheads. The corrosive properties of potential salt binder candidates must be considered.

Further, some salts present health risks, to human operators. In normal manufacturing facilities, these health risks would be somewhat undesirable, but not insurmountable. In other manufacturing facilities, where even more harmful materials (such as beryllium) are being used, there would be no additional deficit to taking precautions to avoid harm by the metal salt.

As an example, silver nitrate could be printed into beryllium powder using a drop on demand type printer.

Molded Bodies

The foregoing discussion has been cast with reference to building up layers of powder material, generally according to 3D Printing techniques. However, the teachings of the invention need not be limited to 3D Printing, or to layered methods. For instance, there are known methods where a powder material is packed into or around a mold, and then the entire body is treated such that it assumes the shape of the mold. According to some of these techniques, a binder is mixed throughout the powder in the mold. According to other such techniques, the powder is sintered, or otherwise heat treated, so that it assumes the shape of the mold.

Figure 10C:
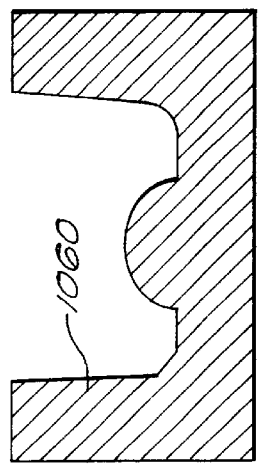
FIGS. 10A, 10B and 10C are a schematic representation of a method of the invention using molding techniques, showing a mold filled with powdered material (FIG. 10A), followed by the adding of a liquid salt solution (FIG. 10B), followed by the removed, molded part (FIG. 10C)
Figure 10B:
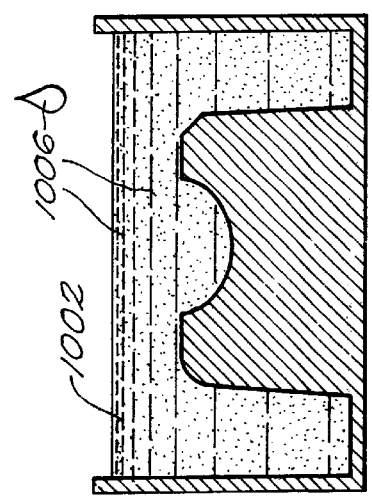
Figure 10A:
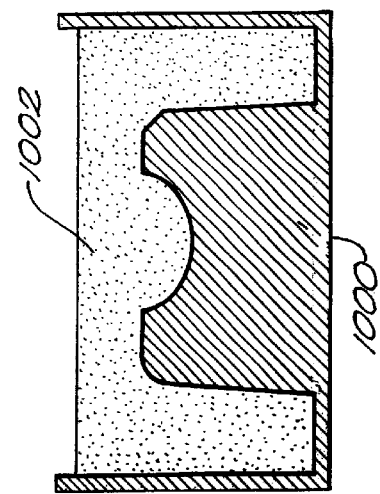

Any of the three general embodiments of the invention discussed above (recrystallization, reduction, and displacement reaction) can be used with a molding method. For instance, as shown in FIG. 10A, a mold 1000 is provided, having the desired shape. The mold is filled with powder 1002 according to any appropriate method. Next, as shown in FIG. 10B, a salt solution 1006 is added to the entire body of powder. The salt solution is allowed to dry. According to the recrystallization embodiment, the process ends with the formation of crystalline salt of a sufficient strength to hold the body 1060 together such that it can be removed from the mold, as shown in FIG. 10C.

According to the reduction embodiment, the dried body is further processed under atmosphere and heat conditions that give rise to reduction of elemental metal, as discussed above. The metal joins adjacent powder grains together, and the entire body has significant strength.

As discussed above, the powder is first placed in the mold, and distributed throughout the mold, as desired. Then, the liquid binder solution is added. This two step procedure has advantages in some situations, as it allows handling of the powder in a dry state. Dry handling of powder is frequently easier to accomplish or more regular than wet powder handling. However, rather than charging the mold with the powder and then applying the salt solution, it is also possible to mix the salt solution with the powder before providing the powder to the mold.

In some cases, the desired end product is a porous body with interconnected porosities and an interconnected skeleton. Such a product is useful as a filter, or catalyst body or flow diffuser. In other cases, a fully dense body is desired. According to either the recrystallization or the reduction embodiment, an infiltrant can be subsequently provided to densify the body.

The displacement reaction method can also be used with a molding technique. In such a case, the mold is charged with powder, and then the liquid salt binder solution is provided throughout the mold. Essentially simultaneously with the introduction of the salt solution, metal starts to deposit onto the surface of the metal powder. This displacement reaction proceeds according to its natural course as discussed above.

Turning now to more specific description of the method by which the powder is first packed into the mold and the liquid is then applied, the powder 1002 may be applied totally dry, so that it flows well and packs well. The salt solution 1006 is then applied and is allowed to infiltrate by capillarity. Next, it is dried. Care must be taken in controlling the drying process, because as the solution dries it tends to be drawn to the outside of the part, that is, toward the surface from which the drying is taking place. If uncontrolled this could result in an inadequate amount of salt in the interior of the body. To some extent, this may be controlled by drying slowly. However, another approach is to add a gelling agent to the salt solution, which will cause the liquid to be bound locally. A third possibility is to make the salt solution composed of two distinct liquid phases, one of which evaporates before the other. After the evaporation of the first liquid phase, the remaining liquid is distributed in discrete and unconnected necks at the powder particles and therefore results in local recrystallization of the salt.

The issue of salt migrating to the drying surface is not relevant in the case of the displacement reaction embodiment of the invention, as the metal will already have come out of solution in that case. That case does, however, raise another concern, in that the displacement reaction should not go to completion until the liquid has infiltrated throughout the full powder bed.

In the alternative case where the salt solution and the powder are premixed before charging the mold, a slurry that is fairly flowable is created. (To be avoided is powder with only a small amount of liquid, as this small amount of liquid just tends to make the powder clump together.) This slurry is then be packed into place and allowed to dry. This approach is most useful for binding by recrystallized salt or reduction of the salt in a furnace operation.

As discussed above, use of the method of the invention with a molding technique may be limited to some extent by the fact that the liquid, and thus the dissolved salt, tends to accumulate more densely at the surfaces of regions of powder where drying takes place. With a layered technique, such as 3D Printing discussed above, non-uniformities through the thickness of a layer can be minimized by reducing the layer thickness until the non-uniformities are acceptable. A similar resolution of the problem may be conducted with molding techniques, by providing powder material to the mold in layers of a thickness determined to minimize the migration of salt during drying. In such a case, it is particularly beneficial to apply the powder in a dry state.

As with the layered techniques, variants exist for the molding technique. In many cases, the mold will not be able to withstand necessary heat treating steps, either to reduce, sinter or melt the metal that is derived from the salt. In such cases, it is possible to remove the forming part from the mold and replace it with a refractory material, such as a settering powder.

Molten Salt

Some salts may be printed in the molten state. The advantage of this approach, over dissolving salts and printing the solution, is that a larger volume of salts may be printed. Further, some salts may not be readily soluble in an acceptable solvent.

Other Forms of Application of Salt

It is another aspect of the current invention that the salt can be applied in manners other than as a liquid solution or a molten salt.

For example, in three dimensional printing, the salt can be applied by first spreading a layer of metal or ceramic powder and then selectively applying the salt as a further material in the condition of a slurry of salt in a liquid vehicle (a liquid in which the salt does not dissolve or which is already saturated with the salt). Alternatively, the salt can be applied as a dry powder not in a liquid vehicle, for example by techniques of dusting powder through a stencil mask. In these cases, the part can be further processed for example, by firing the part in the powder bed to reduce the salt to metal and, if needed to sinter or melt the metal of the salt to increase strength. Other processing paths described in detail above, such as removing the part when it is lightly bound by either salt crystals, r educed metal, or a polymer, or a combination thereof, can also be applied.

Further, for use in three dimensional printing, the salt may be provided in the entire layer of powder as spread with no specification of position in the layer. This can be accomplished by spreading a layer of metal or ceramic powder which is mixed with a fine powder of salt or by coating the metal or ceramic powder with a layer of salt. A coating can be created, for example by milling the powder in a solution of salt, drying the powder and then dry milling to break the powder into individual particles. Other powder coating techniques known in the art can be used. A polymeric binder can then be applied as a further material to define the geometry of the part in the layer. For example, a solution of polyacrylic acid in water can be ink-jet printed into the layer of powder. This solution can dissolve the salt and provide green strength. The part can then be removed from the powderbed and processed according the several methods described above. In some cases, no polymeric additive will be needed in the printed liquid as the dissolved salt may provide sufficient strength for part removal, as discussed above. It should be noted that this mode may be practiced with re-crystallization of salt, thermal reduction of salt or displacement reaction reduction of salt. Further, in this mode, it will be preferred to remove the part from the powderbed before further processing as it will be difficult to distinguish between the regions where liquid was or was not printed.

In the technique of fabricating molded bodies, as discussed above, it is also possible to use dry salt, for example by creating a mix of dry salt with metal or ceramic powder, or by coating the powder with salt.

Shrinkage Tolerant Applications

Aspects of the current invention may also be used in some applications where avoiding shrinkage is not the primary concern. In these cases, printing salt or solutions of salt may be an effective way to provide a metallic binding element. For example, in the manufacturer of cemented tungsten carbide cobalt cutting tools, the conventional practice is to mix fine tungsten carbide powder with fine cobalt powder. For example, one micron tungsten carbide powder and one micron cobalt powder can be mixed in the appropriate volume fractions and a slurry can be used to create spray dried powder. This spray dried powder is then caused to flow into a pressing die. A green cutting insert is then pressed. The insert is then liquid phase sintered to produce a fully dense part.

Using the present invention, the cobalt may be provided through a solution of a cobalt salt such as cobalt acetate. For example, a layer of fine tungsten carbide powder may be deposited and a solution of cobalt acetate may be printed into this powder to both define the geometry of the part and to provide the source for cobalt. Because the tungsten carbide powder is fine, it may be beneficial to deposit the tungsten carbide powder by jetting it in a slurry, as described in a patent application filed under the Patent Cooperation Treaty, designating the US for national phase treatment, under serial number PCT/US98/12280, entitled JETTING LAYERS OF POWDER AND THE FORMATION OF FINE POWDER BEDS THEREBY, in the names of Sachs et al, the disclosure of which is hereby incorporated by reference herein.

One advantage of this embodiment of the invention is that there is no need to mix powders. When powders are mixed, they sometimes have a tendency to separate (unmix). Another advantage, is that more or less of the added material can be placed in different positions. In the known techniques, a relatively homogeneous mix is obtained.

Other examples include the binding of beryllium powder by silver as noted earlier and the binding of titanium and titanium alloy powders by silver, both to be followed by sintering to densify the parts.

Types of Powders

The powder particles may be any shape. Beneficial results have been achieved using gas atomized spherical metal particles. This results in very regular shapes, which flow nicely and are not too difficult to handle. Further, spherical particles provide close to the highest possible packing density, thereby requiring the minimum infiltration. On the other hand, irregular shaped powder particles can also be used. Typically, the particles are on the order of 10 to 200 microns. Such powders, when used in the layered processes described above, may be spread into a new layer as dry powder. Finer powders, such as in the range of 0.5–10 microns may be used as well. However, these will typically have to be applied as a slurry and dried (for example as per the method of patent application serial number PCT/US98/12280 identified above, prior to the administration of a salt solution.

A wide range of types of powder may be used for the body of the part being formed, including both metals and ceramics. In general, the powder must have a sufficiently high enough sintering temperature, $T_{MAX}$, relative to the temperature at which the salt reduces (or, in the case of the crystallization embodiment, crystallizes), so that the powder will not begin to sinter. Further, the powder should be a substance to which the metal of the chosen salt will adhere. In the case of the displacement reaction embodiment, the powder must be a metal.

Many materials are suitable for the powder. Most steels, including tool steel, and stainless steel (particularly 416 SS) are suitable. Other suitable metals include nickel, copper, bronzes, brasses, titanium, titanium alloys, and refractory metals such as tantalum, molybdenum, and tungsten. Suitable ceramic materials include tungsten carbide, titanium carbide and alumina. Some ceramics will be better wetted by metals than others. Silver Nitrate salt solution printed on any of these types of powder provides acceptable results.

To increase the $T_{max}$ of a powder, it is possible to coat it with a more refractory material. For instance chromium can be electroplated onto a steel powder. Some metallic powders can be coated by reaction with a gas at an elevated temperature. For example, stainless steel powder can be oxidized by firing in air at temperatures of 400–700° C. and the oxide will act as a refractory coating. Thus, as used herein and in the claims, "metal" powder shall mean any powder having a metal surface, whether that surface is a coating, for instance around a ceramic powder granule, or a part of a wholly metal particle.

Other Solid Freeform Fabrication Processes

Many of the techniques taught can be applied to other Solid Freeform Fabrication processes, especially those which can use powder, such as Selective Laser Sintering, Fused Deposition Modeling and Laminated Object Manufacturing and other methods using prepared sheets of powder.

In Selective Laser Sintering, the powder can be pre-coated with salt or mixed with fine dry salt, as discussed above. The laser sintering can then cause in-situ thermal reduction of the salt to metal, to create a metal containing part as discussed above. Alternatively, a polymeric binder can be included in the powder as well and the laser sintering can define a green part by polymer binding.

In Fused Deposition Modeling, the salt can be supplied with a metal or ceramic powder in the extrusion feedstock. The salt can be dissolved in the binder material (typically a thermoplastic or other polymer) of the feedstock, included as particles in the feedstock binder, or coated on the metal or ceramic particles.

In a process which can use prepared sheets of powder (e.g. Laminated Object Manufacturing and the CAM-LEM process), the prepared sheet can include salt dissolved in the binder material (typically a thermoplastic or other polymer) of the feedstock, or the salt can be included as particles in the feedstock binder, or coated on the metal or ceramic particles.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A method for forming a body from powder using a three-dimensional printing process, comprising the steps of:
   a. providing a layer of powder of a first material, granules of said powder layer contacting one another;
   b. printing on said layer of powder, at one or more selected regions, a liquid vehicle that contains a metal salt that will cause said powder granules to be bound together at said selected regions;
   c. repeating said steps a and b of providing a layer of powder and printing a liquid on said layer additional times until a desired amount of printed powder has been provided, said selected regions defining a body; and
   d. maintaining said printed liquid and powder under conditions such that a metal, which is different from said first material, and which originates from said salt solution, forms at interfaces between said powder granules, and binds adjacent granules to each other within each layer and between layers, said maintaining step comprising further processing said body at a temperature above which metal from said salt, reduces onto said powder granules at said interfaces.

2. The method of claim 1, said step of further processing comprising the step of further processing said body at a temperature above which said reduced metal begins to sinter.

3. The method of claim 1, said step of further processing comprising the step of further processing said body at a temperature above which said reduced metal begins to melt.

4. A method for forming a body from powder using a three-dimensional printing process, comprising the steps of:
   a. providing a layer of powder of a first material, granules of said powder layer contacting one another;
   b. printing on said layer of powder, at one or more selected regions, a liquid vehicle that contains a metal salt that will cause said powder granules to be bound together at said selected regions;
   c. repeating said steps a and b of providing a layer of powder and printing a liquid on said layer additional times until a desired amount of printed powder has been provided, said selected regions defining a body;
   d. drying said body, in any number of layers, from one at a time to all of said layers simultaneously, such that crystallized metal salt from said salt solution loosely binds said granules to each other to form a bound body;
   e. removing said loosely bound body of granules from any surrounding, unbound powder; and
   f. maintaining said printed liquid and powder under conditions such that a metal, which is different from said first material, and which originates from said salt solution, forms at interfaces between said powder granules, and binds adjacent granules to each other within each layer and between layers, said maintaining step comprising further processing said body at a temperature above which metal from said crystallized salt reduces onto said powder granules at said interfaces.

5. The method of claim 4, said step of further processing comprising the step of further processing said body at a temperature above which said reduced metal begins to sinter.

6. The method of claim 4, said step of further processing comprising the step of further processing said body at a temperature above which said reduced metal begins to melt.

7. The method of claim 4, further comprising, between the steps of removing said loosely bound body and further processing said body at a temperature above which metal reduces, the step of settering said removed body in another, settering powder.

8. The method of claim 1, said reduced metal being formed such that it loosely binds said granules to each other to form a bound body, said method further comprising the steps of:
   a. removing said loosely bound body of granules with reduced metal at interfaces therebetween from any surrounding granules of powder that are not bound by any such reduced metal; and
   b. further processing said body at a temperature above which said reduced metal sinters.

9. The method of claim 8, said step of further processing comprising the step of further processing said body at a temperature above which said sintered metal begins to melt.

10. The method of claim 8, further comprising, between said steps of removing said loosely bound body and further processing said body at a temperature above which said reduced metal sinters, the step of settering said removed body in another, settering powder.

11. A method for forming a body from powder using a three-dimensional printing process, comprising the steps of:
   a. providing a layer of powder of a first material, granules of said powder layer contacting one another;
   b. printing on said layer of powder, at one or more selected regions, a liquid vehicle that contains a metal salt and a polymeric binder, that will cause said powder granules to be bound together;
   c. repeating said steps a and b of providing a layer of powder and printing a liquid on said layer additional times until a desired amount of printed powder has been provided, said selected regions defining a body;
   d. drying said layers, either individually or in groups, such that said granules loosely bind to each other to form a bound body;
   e. removing said loosely bound granules from any surrounding, unbound powder; and
   f. maintaining said printed liquid and powder under conditions such that a metal which is different from said first material, and which originates from said salt solution, forms at interfaces between said powder granules, and binds adjacent granules to each other within each layer and between layers, said maintaining step comprising further processing said body at a temperature above which metal from said salt reduces onto said powder granules at said interfaces.

12. The method of claim 11, said step of further processing comprising the step of further processing said body at a temperature above which said reduced metal begins to sinter.

13. The method of claim 11, said step of further processing comprising the step of further processing said body at a temperature above which said reduced metal begins to melt.

14. The method of claim 11, further comprising, between said steps of removing and further processing said body at a temperature above which metal from said salt reduces, the further step of settering said removed body in another, settering powder.

15. The method of claim 1 said reducing step comprising the step of firing said powder body in an environment that contains a reducing agent.

16. The method of claim 15, said reducing agent comprising hydrogen.

17. A method for forming a body from powder using a three-dimensional printing process, comprising the steps of:
  a. providing a layer of powder of a first material, granules of said powder layer contacting one another;
  b. printing on said layer of powder, at one or more selected regions, a liquid vehicle that contains a metal salt that will cause said powder granules to be bound together at said selected regions;
  c. repeating said steps a and b of providing a layer of powder and printing a liquid on said layer additional times until a desired amount of printed powder has been provided, said selected regions defining a body; and
  d. maintaining said printed liquid and powder under conditions such that a metal, which is different from said first material, and which originates from said salt solution, forms at interfaces between said powder granules, and binds adjacent granules to each other within each layer and between layers, said maintaining step comprising reducing said salt from said liquid so as to form a metal film at said interfaces between said powder granules.

18. The method of claim 17, said salt comprising a film forming salt.

19. The method of claim 18, said salt comprising salt that reduce to metal only at a temperature above that at which the immediate precursor to said reduced metal is molten.

20. The method of claim 17, said salt comprising silver nitrate.

21. A method for forming a body from powder using a three-dimensional printing process, comprising the steps of:
  a. providing a layer of metal powder of a first mate rial, granules of said powder layer contacting one another;
  b. printing on said layer of metal powder, a liquid vehicle that contains a salt that will cause said powder granules to be bound together;
  c. repeating said steps a and b of providing a layer of powder and printing a liquid on said layer, additional times until a desired amount of printed powder has been provided;
  d. maintaining said liquid and metal powder under conditions such that a metal, which originates from said salt solution, reduces from said salt while s aid salt is in said liquid vehicle and adheres to said powder granules at interfaces between said powder granules, and binds adjacent granules to each other within said layer and between layers.

22. The method of claim 21, said step of maintaining said liquid and powder being conducted between said steps of printing and repeating, such that it is also repeated with said steps of providing powder and printing liquid.

23. The method of claim 21, said step of maintaining said liquid and powder being conducted after said step of repeating.

24. The method of claim 22, said step of maintaining said liquid and powder being conducted both between said steps of printing and repeating and after said step of repeating.

25. The method of claim 21, said reducing step comprising the step of contacting said liquid containing salt to said granules.

26. The method of claim 21, said step of reducing said salt to a metal while said salt is in said liquid vehicle resulting in binding of granules of said powder which have been contacted by said solution, said method further comprising the step of removing said bound granules from any unbound granules, to form a body.

27. The method of claim 21, further comprising the steps of:
  a. further processing said body of granules at a temperature above which said reduced metal from said salt sinters thereby resulting in a body of granules that are bound to each other by said sintered metal; and
  b. removing said bound body from any unbound metal powder granules.

28. The method of claim 21, further comprising the steps of:
  a. further processing said body of granules at a temperature above which said reduced metal from said salt melts, thereby resulting in a body of granules that are bound to each other by said melted metal; and
  b. removing said bound body from any unbound powder granules.

29. The method of claim 26, said reduced metal being deposited such that it loosely binds said granules to each other to form a bound body, said method further comprising the steps of:
  a. removing said loosely bound body of granules with reduced metal at necks therebetween from any surrounding granules that are not bound by any such reduced metal; and
  b. further processing said body at a temperature above which said reduced metal sinters.

30. The method of claim 29, said step of further processing comprising the step of further processing said body at a temperature above which said sintered metal begins to melt.

31. The method of claim 29, further comprising, between said steps of removing said loosely bound body and further processing said body at a temperature above which said reduced metal sinters, the step of settering said removed body in another, settering powder.

32. The method of claim 21, said liquid solution further containing a polymeric binder, said maintaining step comprising the steps of:
  a. drying said body, such that said granules loosely bind to each other to form a body;
  b. removing said body of loosely bound granules from any surrounding, unbound powder; and
  c. further processing said body at a temperature above which said reduced metal from said salt sinters at necks where said granules contact each other.

33. The method of claim 32, said step of further processing comprising the step of further processing said body at a temperature above which said reduced metal begins to melt.

34. The method of claim 32, further comprising, between said steps of removing said loosely bound body and further processing said body at a temperature above which said reduced metal sinters, the step of settering said removed body in another, settering powder.

35. The method of claim 21, said powder and said liquid vehicle selected such that said reducing step comprises a displacement reaction.

36. The method of claim 21, said powder and said liquid solution comprises a metal salt solution, said solution and said metal powder being chosen such that the metal of the powder is capable of providing electrons to metal ions of said salt as metal of said powder dissolves into said solution.

37. The method of claim 21, further wherein said metal of said salt is more negative (noble) as measured on the electromotive force series, than said metal of said metal powder.

38. A method for forming a body from powder, comprising the steps of:
  a. providing a volume of powder of a first material, granules of said powder volume contacting one another;
  b. while maintaining said granules of said volume of powder substantially stationary relative to each other, providing in said volume of powder, a liquid vehicle that contains a metal salt, which will cause said granules to be bound together; and
  c. maintaining said liquid and powder under conditions such that a metal, which is different from said first material and which originates from said salt solution, forms at interfaces between said powder granules, and binds adjacent granules to each other, said step of maintaining said liquid and powder comprising the step of processing said liquid and powder to form necks of said metal between said powder granules, which necks bind said granules, said step of processing said liquid and powder comprising:
    i. drying said body; and
    ii. further processing said body at a temperature above which metal from said salt reduces onto said powder granules at interfaces where said granules contact each other.

39. The method of claim 38, said step of further processing comprising the step of further processing said body at a temperature above which said reduced metal begins to sinter.

40. The method of claim 38, said step of further processing comprising the step of further processing said body at a temperature above which said reduced metal begins to melt.

41. A method for forming a body from powder, comprising the steps of:
  a. providing a volume of powder of a first material, granules of said powder volume contacting one another;
  b. while maintaining said granules of said volume of powder substantially stationary relative to each other, providing in said volume of powder, a liquid vehicle that contains a metal salt, which will cause said granules to be bound together; and
  c. maintaining said liquid and powder under conditions such that a metal, which is different from said first material and which originates from said salt solution, forms at interfaces between said powder granules, and binds adjacent granules to each other, said step of maintaining said liquid and powder comprising reducing said salt to a metal.

42. The method of claim 41, said reducing step comprising the step of firing said powder body in an environment that contains a reducing agent.

43. The method of claim 42, said reducing agent comprising hydrogen.

44. The method of claim 1, further comprising, after said step of printing and before said step of repeating, the step of drying said printed layer, and further, wherein said step of repeating also includes repeating said step of drying said printed layer.

45. The method of claim 1, further comprising, the step of drying said printed layers, said step of drying being conducted to dry at least two of said layers substantially simultaneously.

46. The method of claim 45, said step of drying comprising drying substantially all of said layers substantially simultaneously, after all of said layers have been provided and printed.

47. The method of claim 17, said salt comprising a salt that reduces to a metal and forms a film at a temperature below a temperature at which said metal of said salt begins to melt.

48. The method of claim 17, said step of maintaining comprising reducing said salt from said liquid so as to form a metal film at said interfaces between said powder granules, said reduction step being carried out at a temperature below a temperature at which said metal of said film begins to melt.

49. A method for forming a body from powder using a three-dimensional printing process, comprising the steps of:
  a. providing a layer of powder of a first material, granules of said powder layer contacting one another;
  b. printing on said layer of powder, at one or more selected regions, a liquid vehicle that contains a metal compound that will cause said powder granules to be bound together at said selected regions;
  c. repeating said steps a and b of providing a layer of powder and printing a liquid on said layer additional times until a desired amount of printed powder has been provided, said selected regions defining a body; and
  d. maintaining said printed liquid and powder under conditions such that a metal, which is different from said first material, and which originates from said liquid vehicle and metal compound, forms at interfaces between said powder granules, and binds adjacent granules to each other within each layer and between layers, said maintaining step comprising further processing said body at a temperature above which said compound, reacts to form a metal onto said powder granules at said interfaces.

50. The method of claim 49, said step of further processing comprising further processing said body at a temperature above which said compound reduces to form a metal.

51. The method of claim 49, said step of further processing comprising further processing said body at a temperature above which said compound decomposes to form a metal.

52. The method of claim 49, said step of further processing comprising further processing said body under conditions such that said compound reduces to form a metal.

53. The method of claim 49, said step of further processing comprising further processing said body under conditions such that said compound decomposes to form a metal.

* * * * *